United States Patent [19]

Witchey

[11] Patent Number: 5,398,241
[45] Date of Patent: Mar. 14, 1995

[54] HIGH SPEED ASYNCHRONOUS MULTIPLEXER DEMULTIPLEXER

[75] Inventor: Michael Witchey, Sarasota, Fla.

[73] Assignee: Loral Fairchild, Syosset, N.Y.

[21] Appl. No.: 217,959

[22] Filed: Feb. 3, 1994

Related U.S. Application Data

[63] Continuation of Ser. No. 44,425, Apr. 30, 1987, abandoned.

[51] Int. Cl.[6] .......................... H04J 3/26; H04J 3/22
[52] U.S. Cl. ........................................ 370/84; 370/94.1
[58] Field of Search ................. 370/60, 60.1, 94.1, 370/94.2, 112, 84, 13, 17, 61

[56] References Cited

U.S. PATENT DOCUMENTS

| | | | |
|---|---|---|---|
| 4,317,195 | 2/1982 | Barberis et al. | 370/94.1 |
| 4,484,327 | 11/1984 | Hanson | 370/84 |
| 4,538,259 | 8/1985 | Moore | 370/94.1 |
| 4,612,636 | 9/1986 | Grover et al. | 370/94 |
| 4,654,860 | 3/1987 | Ouimet et al. | 370/84 |
| 4,779,267 | 10/1988 | Limb | 370/94.1 |

*Primary Examiner*—Wellington Chin
*Attorney, Agent, or Firm*—Sterne, Kessler, Goldstein & Fox

[57] ABSTRACT

A high speed asynchronous data multiplexer/demultiplexer system which multiplexes a quantity of independent and asynchronous data streams into a single packetized data stream and then demultiplexes and presents the original input signals at a remote site in their original form is described. The output bit rate of the demultiplexer is generated responsive to the packet arrival frequency of data from each particular channel and the output buffer fullness of that channel. This process reduces the amount of processing required, such that the effective bandwidth of the system can be greatly expanded.

23 Claims, 31 Drawing Sheets

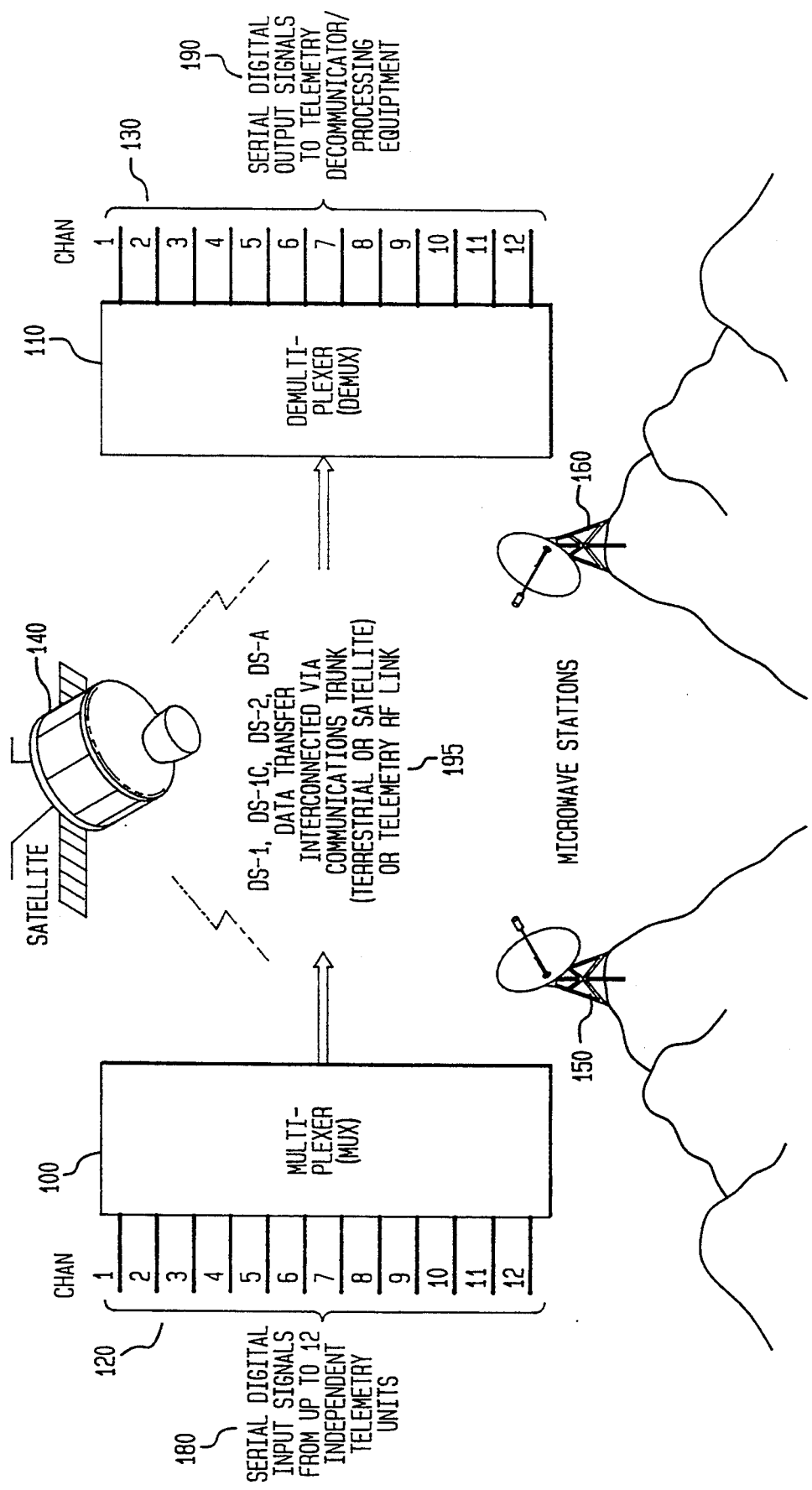

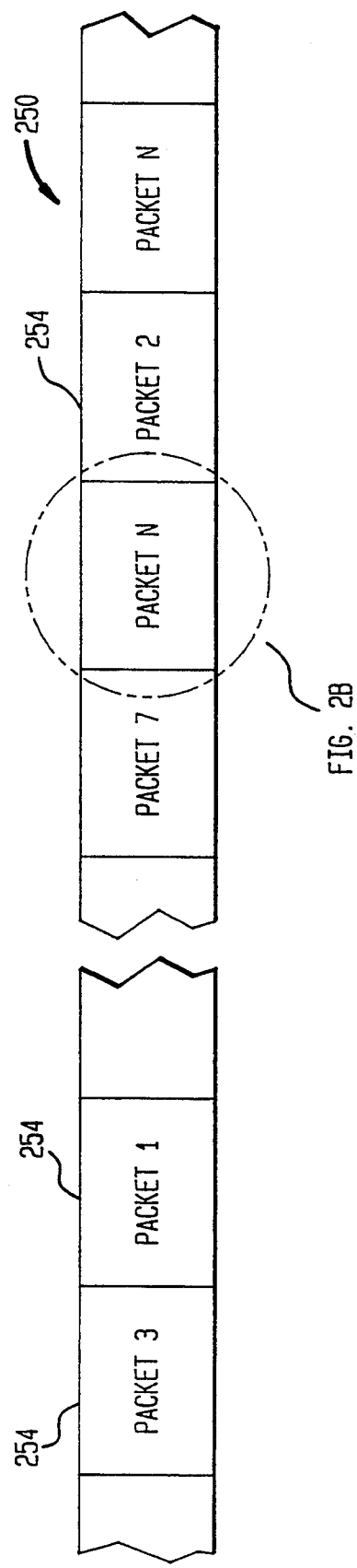

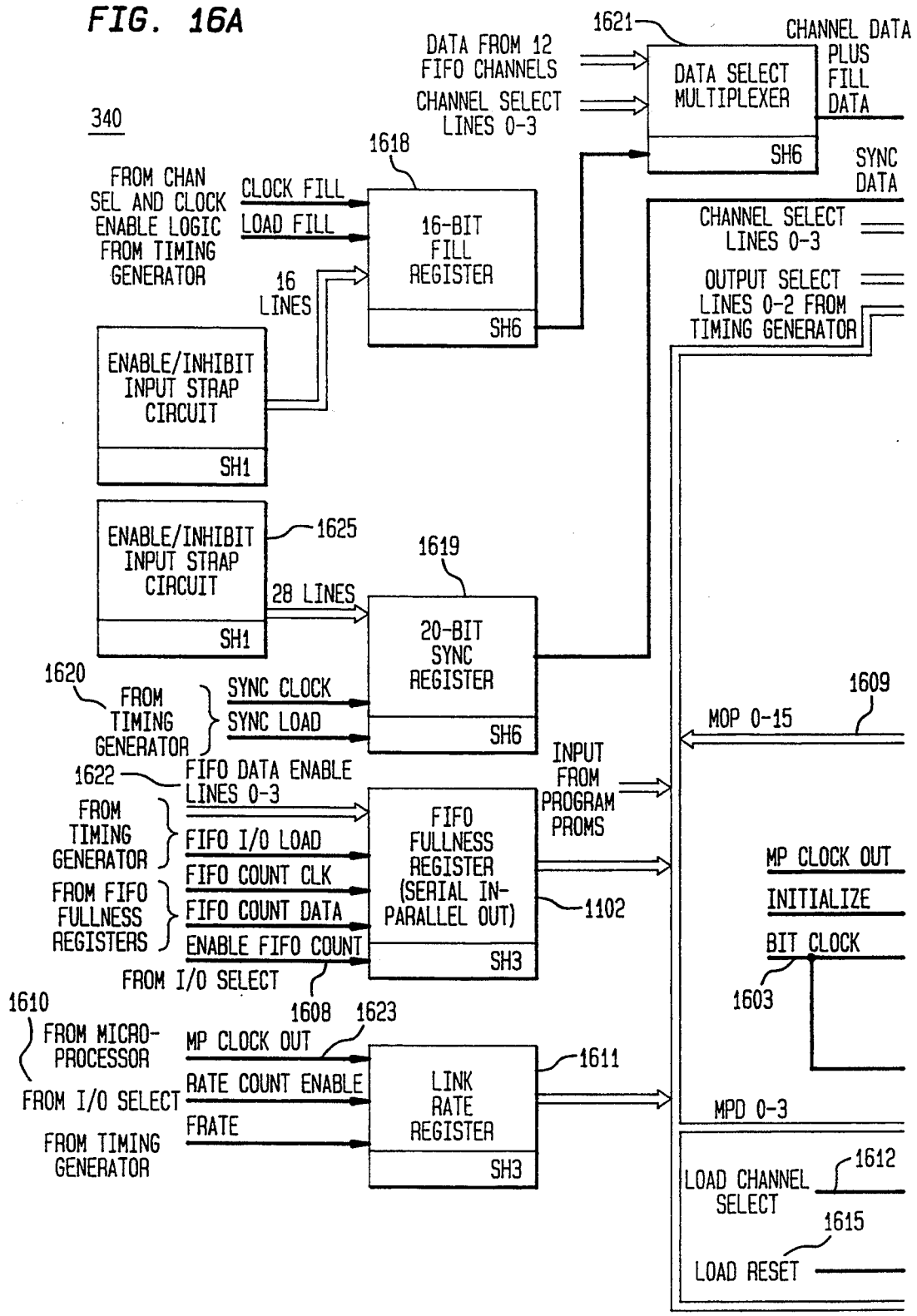

1801

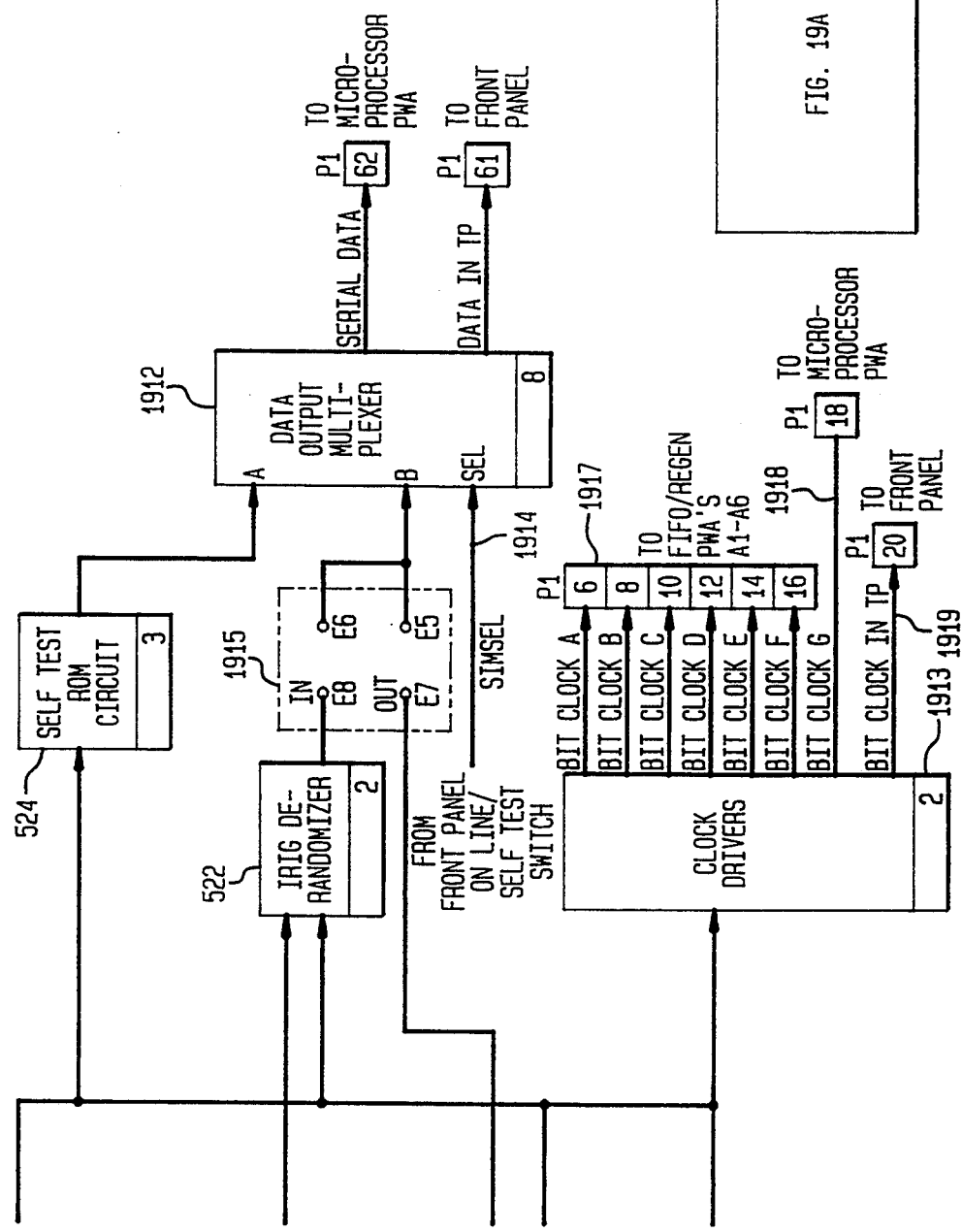
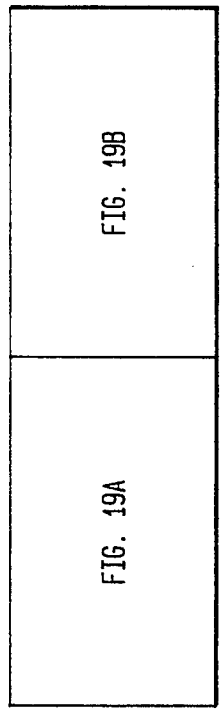

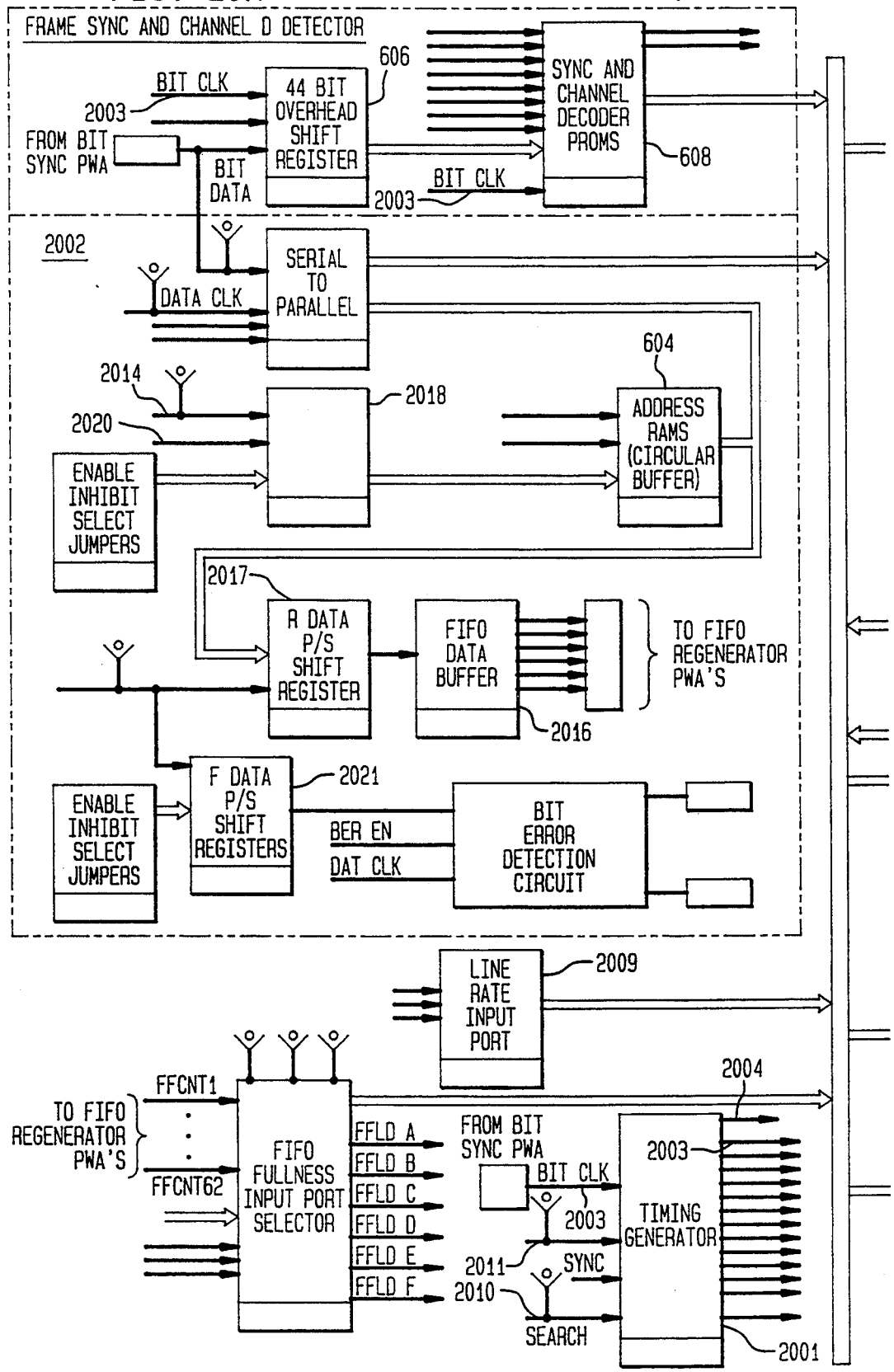

FIG. 20B
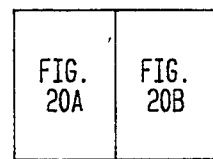
FIG. 20
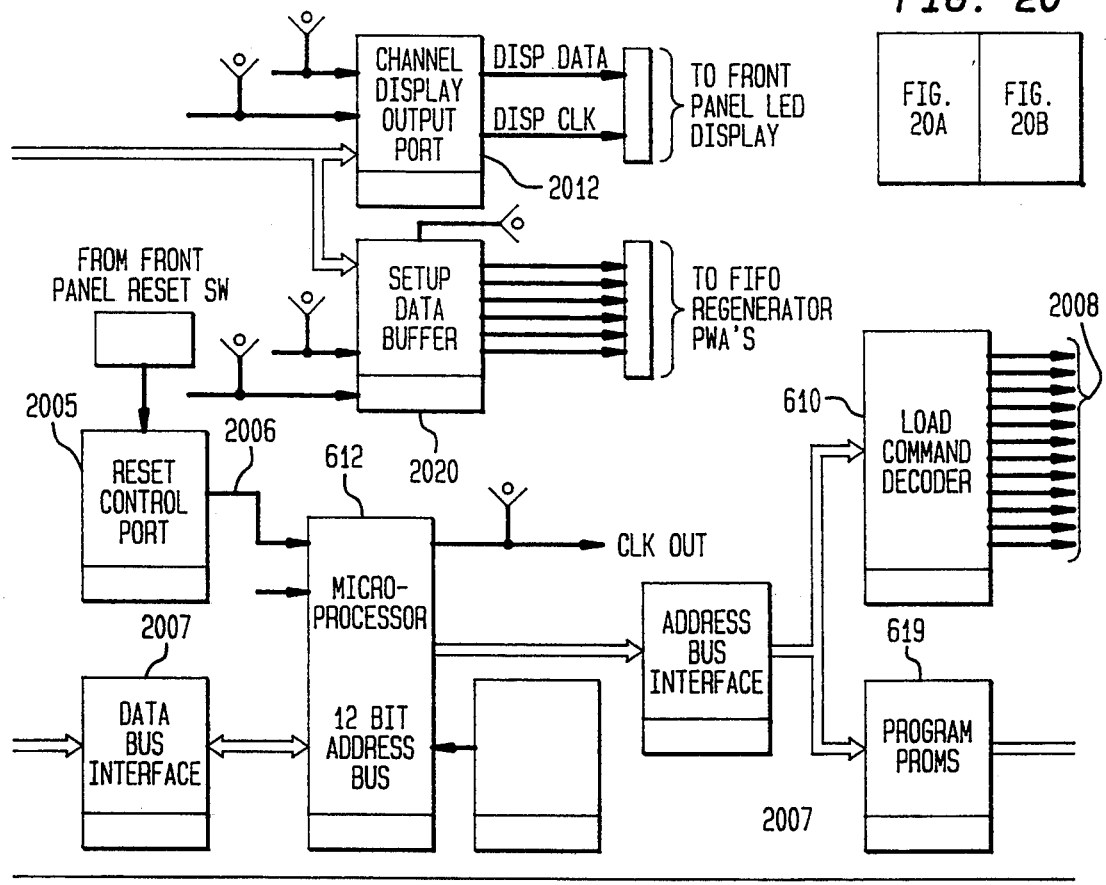
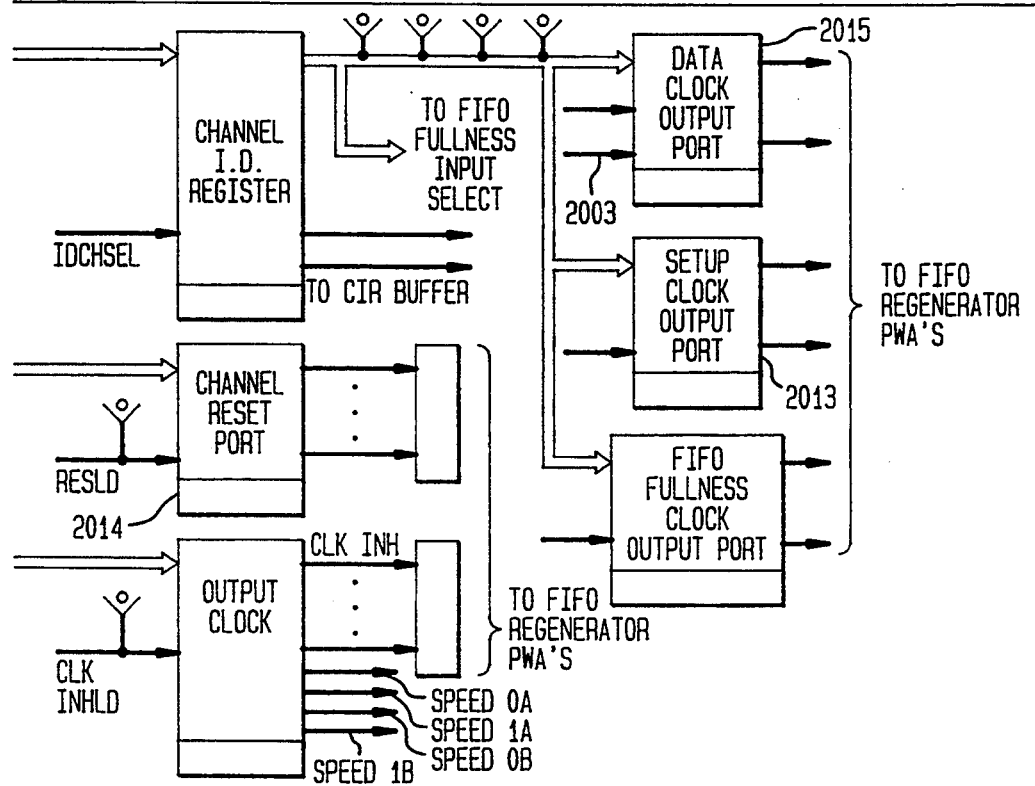

FIG. 22

HIGH SPEED ASYNCHRONOUS MULTIPLEXER DEMULTIPLEXER

This application is a continuation of application Ser. No. 044,425, filed Apr. 30, 1987, now abandoned.

BACKGROUND OF THE INVENTION

1. Field of the Invention

The present invention is related generally to data multiplexers/demultiplexers utilized with asynchronous data streams, and more particularly to high speed asynchronous data multiplexers/demultiplexers that combine or multiplex a quantity of independent and asynchronous data streams received at a first location into one data stream, and then demultiplex them and present them at a remote site in the identical form in which they were supplied.

2. Description of Related Art

A multiplexer is a device for simultaneous transmission of separate information streams. As applied to data communications, the term "multiplexer" refers to methods for sharing communications resources. A typical use for multiplexers/demultiplexers is in the telemetry field. In this application, multiple independent data streams from a test vehicle are transmitted to a remote site where the data is multiplexed and retransmitted to a different facility, at which the data is processed and reduced for display and analysis.

Communication of data between a multiplexer and demultiplexer is typically accomplished utilizing a frame structure. A frame is a group of data that is transmitted together with synchronization and identification data that can be identified by the receiving device. Conventional multiplexed data is transmitted using a frame format containing data from all of the input signals to be multiplexed. Typical frame structures include data embedded within the frame that describes the position of the data from the various inputs within that frame. Thus, the typical frame contains data from all the different inputs being multiplexed within each frame, and information describing the location of the data from each input within the frame, so that the demultiplexer can shift the data to the appropriate output channel.

Typically portions of an overall message, or of a particular input signal, are arranged so that the interval between segments of the message are uniform. A phase locked loop may be used to stabilize the output clock bit rate of the multiplexer based on the bit arrival frequency. However, if the data rates within the system change slightly or if the data is asynchronous, filler bits are employed to complete particular time-slots. The filler bits then must be identified by codes within the frame structure, for deletion from the output. This increases system complexity.

The conventional solution to problems with the standard frame format, in which data segments from each input signal are separated at equal intervals, is to put all the data, i.e. segments of messages from all the input signals, into one main data frame. Within this frame, individual words (that is, relatively small numbers of bits) of the input signals to be multiplexed are sent at intervals together with header and other non-message information indicating the parameters required to decode the multiplex signal, such as bit rate clocking information. Clearly, where a number of channels are to be multiplexed, this non-message information may be coextensive in amount with the actual message information itself. Hence, conventional multiplexers have a very limited information transmitting capability as compared to the total number of bits (that is, control information as well as data) which are transmitted from multiplexer to demultiplexer. Accordingly, this conventional approach requires sophisticated data processing and correspondingly complex methodology to construct and decompose the frame. Data transmission then becomes bandwidth limited, reducing throughput.

Typically, a multiplexing algorithm is employed to construct the data frame so as to place data from all of the individual input channels into the overall data structure to be communicated from the multiplexer to the demultiplexer. Where the input bit rates of the various input signals vary somewhat, as is largely inevitable, some "jitter" is introduced by the multiplexing algorithm. This jitter is difficult for system hardware to smooth out without losing the bit count integrity of the transmitted data stream.

Additionally, conventional devices require complete reprogramming to reconfigure the system every time the user desires to increase or decrease the number of channels input to the multiplexer/demultiplexer, adding to system cost and wasted manpower.

SUMMARY OF THE INVENTION

The present invention comprises a high speed data multiplexer/demultiplexer system and method. The high speed multiplexer/demultiplexer of the present invention multiplexes a quantity of independent and asynchronous data streams into one data stream and then demultiplexes them for presentation at a remote site in a form identical to that in which they were presented to the multiplexer.

More particularly, and as opposed to a system in which a relatively small number of data bits from each input are transmitted at regular intervals together with information concerning clock information, data rate and the like, according to the present invention data arriving continuously from each channel is received and stored or "buffered" by the multiplexer according to the invention. When a relatively large amount or "packet" of data from a single channel has been accumulated by the multiplexer, it is transmitted in a single "frame" together with a single relatively small amount of header or other identifier information indicating the channel number of the data. In essence, all of the same information transmitted in the prior art techniques is transmitted by the multiplexer according to the invention. However, the relative amount of "message" information associated with each element of the "overhead" information is much greater. Accordingly, the ratio of message data to overhead data transmitted by the large-packet multiplexer according to the invention in a given period of time is much higher than in the smaller-segment transmission modes provided previously.

At the demultiplexer end, the individual packets of data are received and stored. The overhead information associated with each packet of data in its frame is used to associate each large packet of data with the channel from which it was originally received by the input multiplexer. The data is then read out of the demultiplexer buffers at the same rate in which it was stored in the multiplexer buffers. According to the invention the output signals from the demultiplexer therefore precisely match the input signal received by the multiplexer.

According to the present invention, the output clock signal employed by the demultiplexer in connection with each channel is generated based on the arrival frequency of packets from that particular channel and the output buffer fullness of that channel. This reduces the amount of processing required, so that the system bandwidth can be greatly expanded, thereby greatly increasing the data rate.

At the multiplexer, data from individual input channels is buffered, effectively being segregated into packets, so that it is not combined with data from other channels. Frames containing packets of data are transmitted only when the particular buffer is full; therefore, no filler bits are required within a frame. All frames are identical in structure.

The system of the present invention automatically reconfigures itself to whatever channels the user may wish to utilize. The multiplexer and the demultiplexer communicate frames all of which contain packets of data from a single input channel.

The present invention requires no operator intervention for both initial setup and on line reconfiguration. No reverse direction (demultiplexer to multiplexer) communication needs to be available for operation of the system of the present invention.

BRIEF DESCRIPTION OF THE DRAWINGS

The present invention will be better understood with reference to the specification and the accompanying drawings, in which:

FIGS. 2a and 2b depict the transmission format according to the present invention.

FIG. 20 is a detailed block diagram of the microprocessor circuit of the demultiplexer of the present invention.

FIG. 22 is a detailed block diagram of the FIFO clock regenerator circuit of the demultiplexer of the present invention.

DESCRIPTION OF THE PREFERRED EMBODIMENT

Table of Contents

I. BRIEF OVERVIEW OF THE PRESENT INVENTION
  1. System Outline
  2. Multiplexer Overview
  3. Demultiplexer Overview
  4. Demultiplexer Block Overview
  5. Multiplexer Block Overview II. DETAILED FUNCTIONING OF THE MULTIPLEXER
  1. Input PWA 310 Block Diagram Description
  2. Channel Interface PWA 320 Block Diagram Description
    Operation of Channel Interface Circuits
    Operation of Channel Monitor Circuits
  3. FIFO PWA 330 Block Diagram Description
    On line/self-test Data Selection
    Data Processing
    FIFO Fullness Circuitry
  4. Microprocessor PWA 340 Block Diagram Description
    Timing Generator
    Microprocessor Circuits
  5. Output PWA 350 Block Diagram Description
    Clock Synthesizer Circuit
    Link Output Circuits III. DETAILED FUNCTIONING OF THE DEMULTIPLEXER
  1. Bit Sync PWA 410 Block Diagram Description
    Input Interface Circuit
    Clock Synthesizer/Bit Synchronizer Circuit
    Self Test Pattern Generator
  2. Microprocessor PWA 420 Block Diagram Description
    Timing Generator
    Microprocessor
    Input Decoding and Circular Buffer 3. FIFO/CLK Regenerator PWA 450 Block Diagram Description
   Data Control Circuit
   Clock Generator
4. Output Interface PWA 440 Block Diagram Description
   Clock Synthesizer Circuit
   T1 Encoder Circuit
   Output Driver Circuit
5. Data Transmitter PWA 430 Block Diagram Description
   Channel Input Circuits
   Channel Monitor Circuits

DETAILED DESCRIPTION

I. BRIEF OVERVIEW OF THE PRESENT INVENTION

1. SYSTEM OUTLINE

Figures 1, 19A:
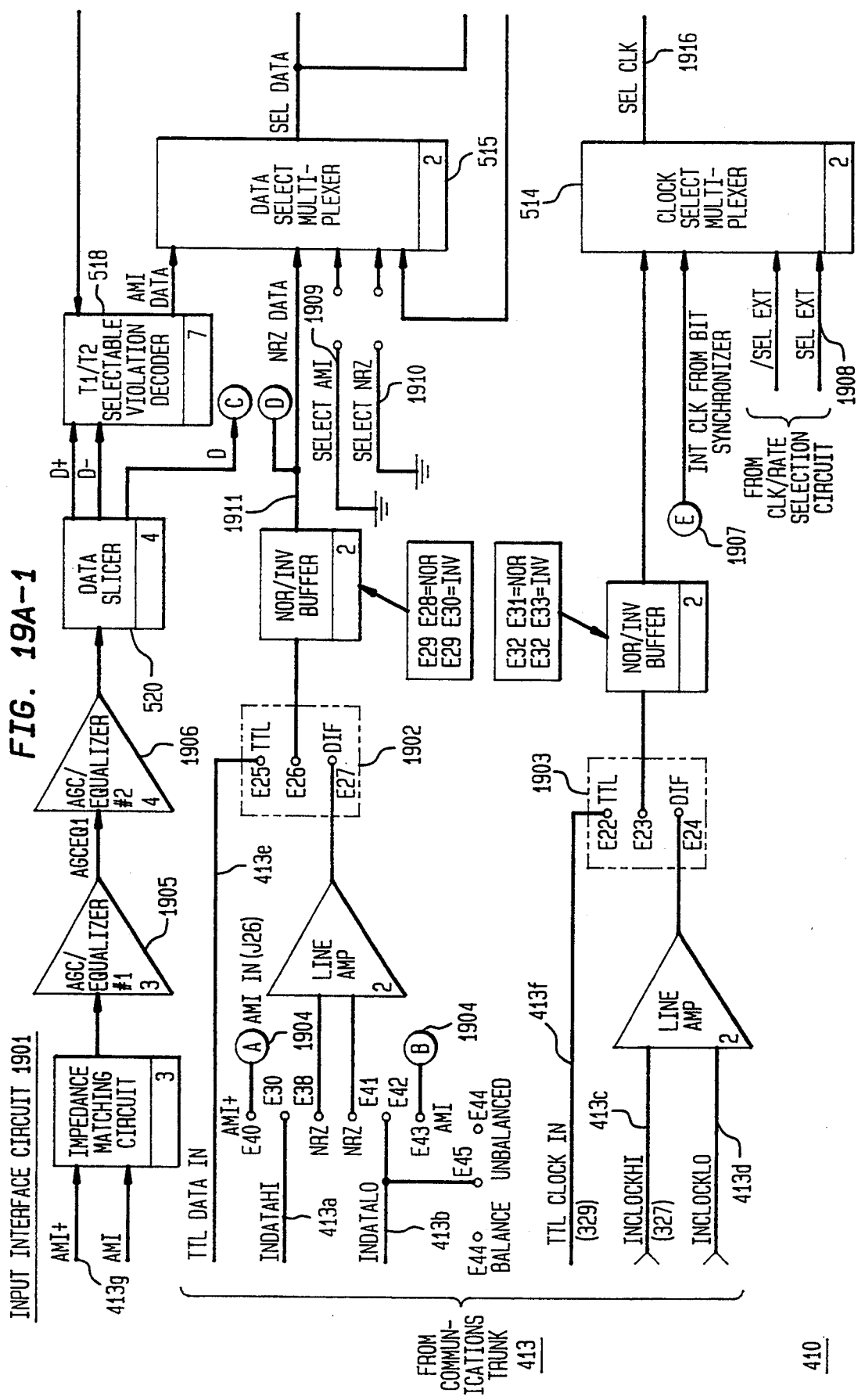
FIG. 1 is a simplified block diagram of a multiplexer/demultiplexer communication system.

FIG. 1 shows an outline of a communication system according to the present invention. A multiplexer 100 (MUX) receives up to 12 channels of individual information from up to 12 individual telemetry units, as indicated at 120, 180. The multiplexer according to the invention buffers these input channels and associates header and trailer information with the packets of data thus created. This information provides a demultiplexer 170 the data needed to reconstitute the original 12 channels of input information. As mentioned, this is in contravention of prior art practice in which individual messages (which may comprise digital words or other relatively small quantities of data) were separately transmitted with associated header and other information. According to the invention, the header information employed is associated with a much larger amount of message data, thus reducing system processing overhead.

The multiplexed signal is then transmitted, e.g., from a microwave station 150 to a satellite 140. The satellite 140 retransmits the signal to a second ground station 160, at which time it is supplied to a demultiplexer (DEMUX) 170. The demultiplexer 170 uses the overhead data provided with each of the packets to put the packets of data into individual channel buffers and regenerate the original continuous associated output clocking signals corresponding to the rates at which the data was supplied to the multiplexer 100, and supplies up to 12 serial digital output signals to whatever processing equipment is appropriate.

Figure 2B:
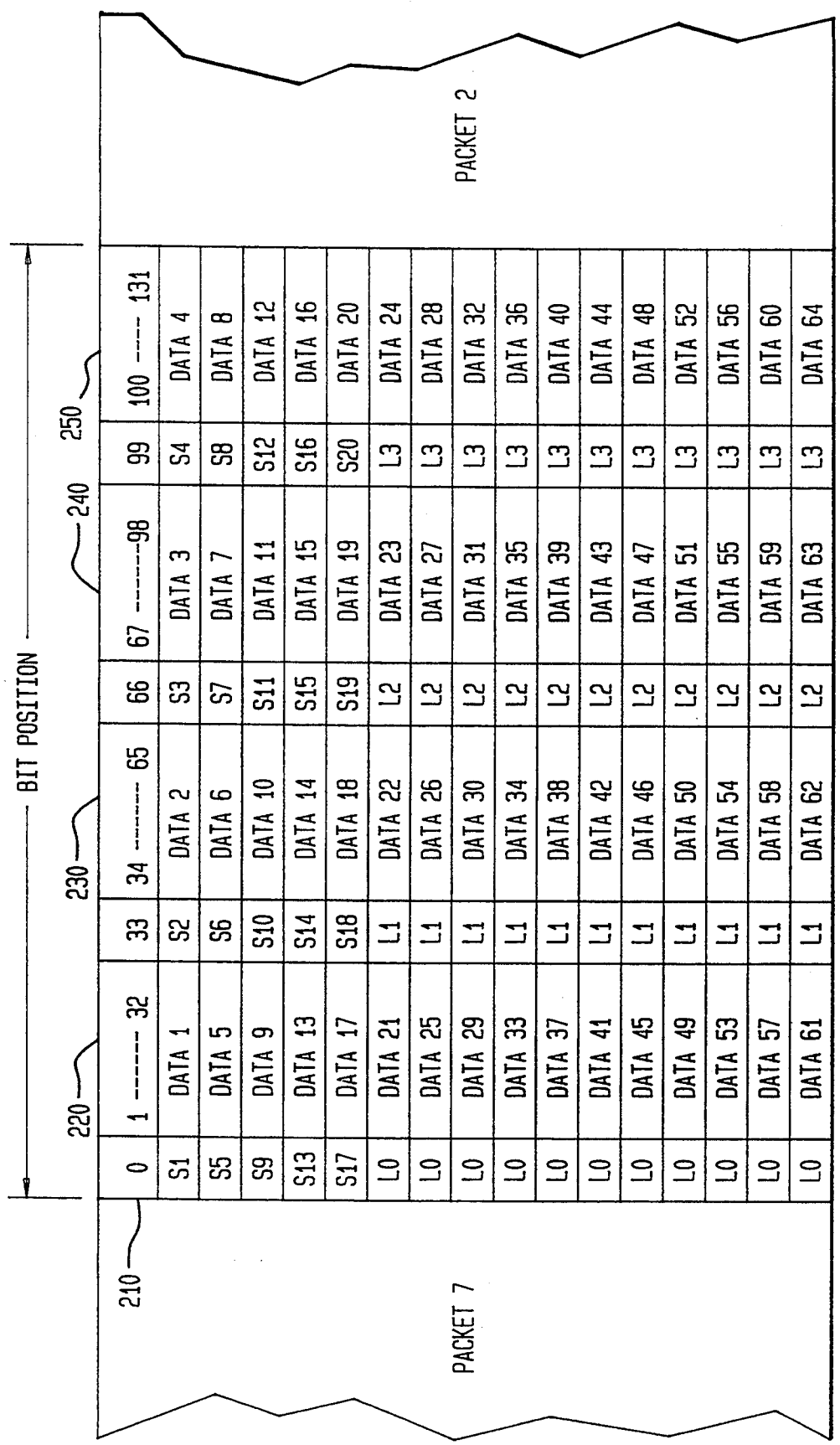

FIG. 2 shows the transmission format according to the present invention. FIG. 2a shows the overall transmission format, while FIG. 2b is an enlarged portion of a portion of the overall format showing in detail the format of one of the frames. As shown in FIG. 2a, the overall message stream 250 comprises a number of frames 254 each of which contains a packet of data from a single numbered channel.

The packets are not sent in any predetermined order or at any particular per-channel frequency. Instead frames 254 containing packets of data and the needed overhead information are sent as the FIFO buffers in the multiplexer storing data from the channels fill. Thus the frames 254 (which are numbered in FIG. 2 corresponding to the channels from which the data in the packets came) are not numbered sequentially. Nor are the frames organized into any larger data structure.

FIG. 2b shows a detail of one of the frames, showing the overhead bits and the data packet. As indicated, the packet comprises 64 32-bit words, denominated data 1 . . . data 64. Each is proceeded by an overhead bit. For the first 20 words these bits S1–S20 provide a 20-bit synchronization pattern; the remaining 44 data words are preceded by a 4-bit link ID code L0 . . . L3 which is repeated 11 times for durability in transmission. The link bits L0–L3 serve to identify the channel to which the particular packet pertains.

The fact that the data bits are shown in FIG. 2b organized into four columns 220, 230, 240, 250 is not meant to imply that they are synchronously transmitted; the bits are transmitted in the order data1–data64, interspersed as mentioned with the synchronization bits S1–S20 and subsequently by the link bits L0–L3. In this way a packet of 64 words of data is transmitted in a frame with a single set of overhead information provided by the S and L bits. Previously, for example, the 4-bit link ID and the synchronization pattern might have had to have been transmitted in association with each of the 64 words, which clearly would have been relatively inefficient.

2. MULTIPLEXER OVERVIEW

Figure 3:
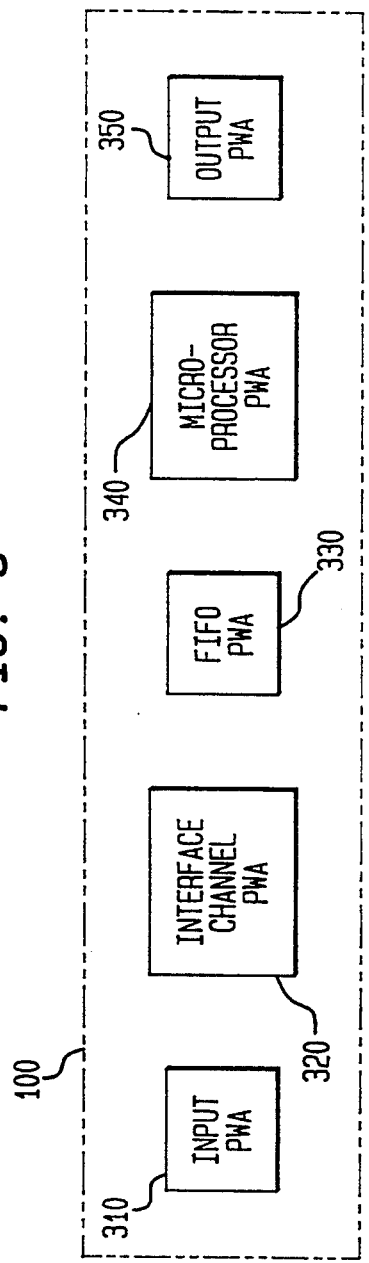
FIG. 3 is a simplified block diagram of the multiplexer of the present invention.

FIG. 3 is an overall block diagram of the Multiplexer 100 of the present invention. Throughout this description, the circuit will be divided, as in the preferred implementation, into a number of Printed Wiring Assemblies (PWAs). For example, the multiplexer is comprised of 5 major PWAs, as shown in FIG. 3, as follows:

1. Input PWA 310
2. Channel Interface PWA 320
3. FIFO PWA 330
4. Microprocessor PWA 340
5. Output PWA 350

A brief description of each of these PWAs follows; their detailed implementation is discussed below.

In normal operation the multiplexer 100 receives asynchronous input data streams and clocks on the input PWA 310. Each independent input stream is buffered into individual FIFO (First In First Out) memories on FIFO PWA 330. The FIFOs are capable of holding eight 2048-bit data packets. The microprocessor (mP) on the microprocessor PWA 340 monitors the FIFO fullness count. The mP uses this count to establish the channel priority for packet transmission. At each output frame time, after interrogating the FIFO fullness, the mP will determine which data packet, if any, is to be sent in the next output frame interval. If no data packets are ready, the mP sends a filler packet during the next output frame interval. Data packets are shifted out of the input card at a rate compatible with the link transmission requirement, i.e., 1.544, 6.312, or 12.928 MBPS.

The microprocessor PWA 340 contains the microprocessor, several multiplexers and an output sequencer PROM. The mP has a number of tasks in the multiplexer. It calculates the nominal frequency of each individual channel. The cumulative sum of channel frequencies is calculated and compared to 90% of the link bandwidth to check for link composite frequency overload. The mP also checks individual channel frequencies to determine if they have drifted more than +5% from their originally measured nominal value.

In the case of a composite frequency overload to the multiplexer, there are two courses of action the mP can initiate. If a composite frequency overload occurs during normal operation, the last channel to be activated will not be accepted by the multiplexer. If a composite frequency overload is present at power up, then priority is given to the fastest channels first.

The sequencer PROM on the microprocessor PWA uses the output clock rate to control the proper insertion of the synchronization pattern and channel ID pattern. It also controls insertion of the fill packet when the mP indicates that no data packet is available.

The output PWA 350 contains a crystal controlled synthesizer that provides link operation at the DS-1, DS-2 and DS-A link frequencies. It also contains all the output data encoders, and the output interface circuitry.

3. DEMULTIPLEXER OVERVIEW

Figure 4:
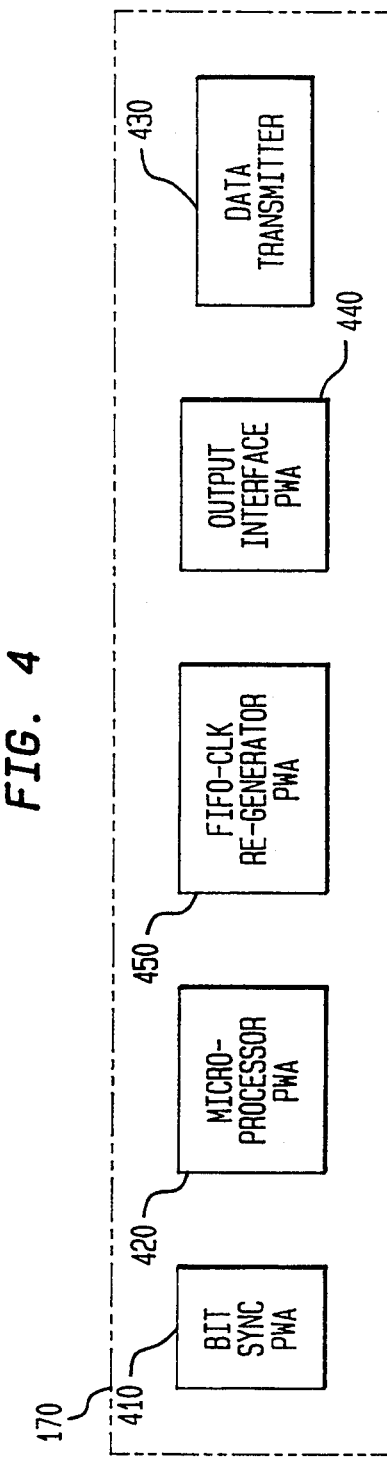
FIG. 4 is a simplified block diagram of the demultiplexer of the present invention.

FIG. 4 shows a block diagram of the asynchronous demultiplexer 170 of the present invention. The unit comprises 5 PWAs as follows:

1. Bit Sync PWA 410
2. Microprocessor PWA 420
3. FIFO/CLK Regenerator PWA 450
4. Output Interface PWA 440
5. Data Transmitter PWA 430

The Bit Sync PWA 410 provides input interface to the demultiplexer of the present invention. It is designed to accept data from a microwave link, a fiber optics receiver, a decryption device or the like. Data can be at any three link frequencies, 1.544, 6.312 or 12.928 MBPS, corresponding to operation at the conventional DS-1, DS-2 or DS-A link rates respectively.

The link data and clock signals are fed to a frame synchronizer and circular buffer located on the microprocessor PWA 420. The frame synchronizer strips the synchronization pattern and channel ID overhead from the incoming packet of data and stores it in a shift register. The shift register outputs are used to address decoding PROMs that determine the number of bits in error in the sync pattern and also decode the channel ID. The mP monitors the synchronization bit error count. This information is used to shift the correlation window to the shift register throughout the data frame until the synchronization pattern is found. When the correct pattern is found, an in-sync condition is established. The circular buffer is used to hold the incoming packet until the channel identification can be determined. Once synchronization is established, the same shift register outputs are used to address PROMs that employ a voting scheme to determine the value of the redundantly encoded channel ID. The decoded channel ID is input to the mP. The mP then provides commands that steer the stripped data packet from the circular buffer to the Output PWA 440.

The mP also measures the interval between successive packet arrivals for each channel. These packet arrival intervals are averaged with a recursive averaging scheme. The elements of the average, called packet counts, are the total number of packets received over the link between successive packets for the channel of interest. When a new packet for the channel of interest is received, that channel's average packet frequency is updated and its packet counter is reset. The average is used to compute the channel incoming bit rate which is required for output clock regeneration.

The mP also maintains a recursive average of the output FIFO fullness. The average fullness is used to determine the FIFO's deviation from a half full condition. This deviation is used to provide feedback to the output clock regeneration servo. The FIFO fullness feedback loop is also required in order to keep small clock rate errors from causing overflow or empty conditions in the output FIFO.

4. DEMULTIPLEXER BLOCK DIAGRAM

FIGS. 5 through 8 provide simplified block diagrams of the demultiplexer used according to the present invention, while FIGS. 9 through 12 show corresponding simplified block diagrams of the multiplexer. A brief discussion of these, to identify the major circuit functions performed by the various PWAs shown in outline form in FIG. 4, is followed by a discussion of the detailed circuitry in FIGS. 13 through 25.

As mentioned, FIGS. 5 through 8 show simplified block diagrams of the demultiplexer. If these Figures are lined up next to one another, the connections between the circuits of FIGS. 5–8 will be clearly apparent. The input circuit shown in FIG. 5 receives the input data at 413 and from this generates data and clock signals which are employed by the subsequent circuitry. In essence, according to the invention, several different clock rates can be generated depending on whether the data input rate is one of several conventional rates which are supported.

More particularly, in a preferred embodiment, AMI and NRZ data are accepted and are multiplexed by data multiplexer 515 depending on the incoming channel frequency. Similarly, different signal levels are also supported and are selected by switch members 510, 508. Clock signals generated from the incoming data are supplied to a clock multiplexer 514 which also is supplied to an internal clock system generated by a bit frequency synchronizer 516.

Figure 5:
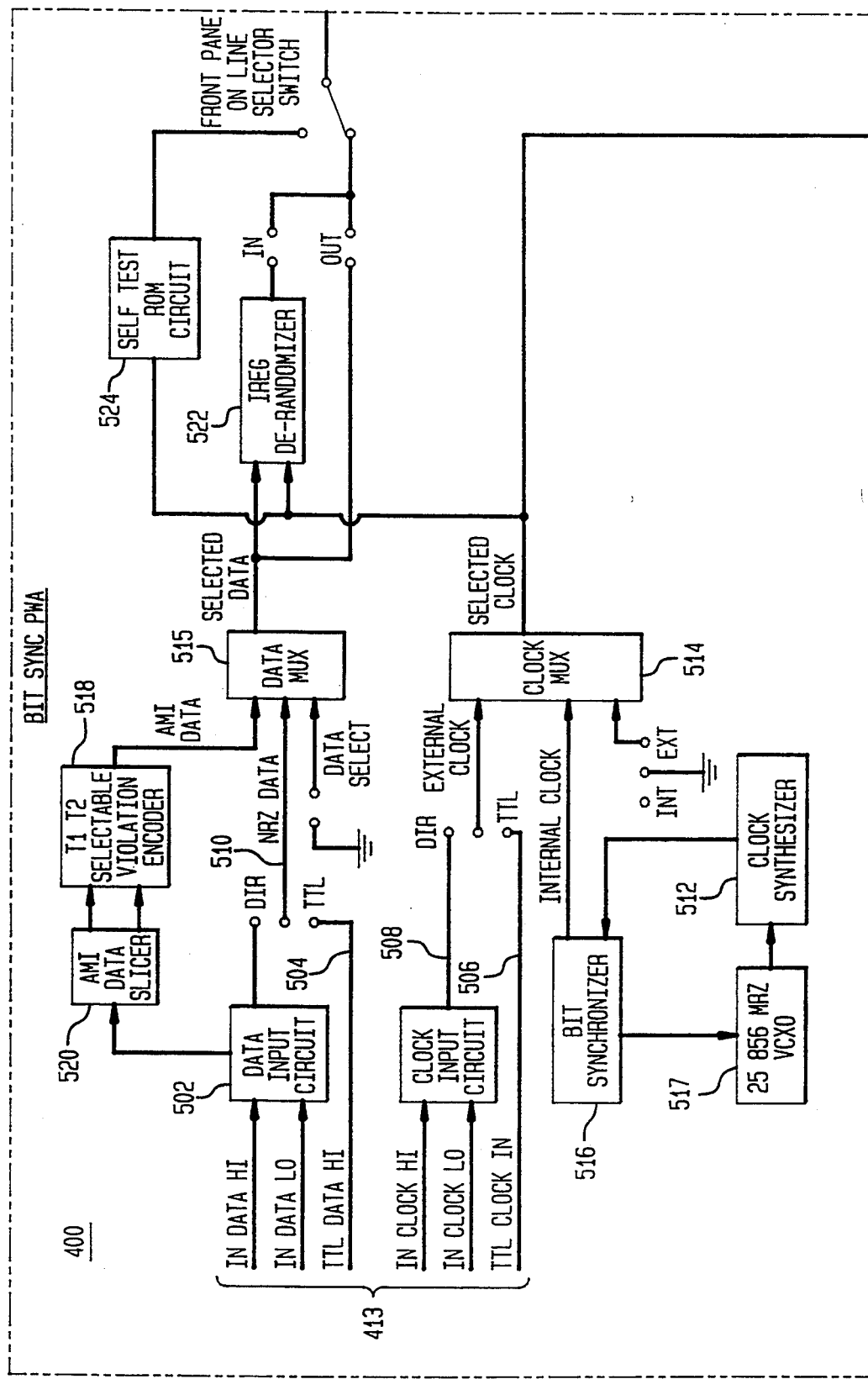
FIG. 5 is a simplified block diagram of the bit synchronizer circuit used in the demultiplexer of the present invention.

Other elements shown in FIG. 5, such as an AMI data slicer 510, a T1/T2 Selectable Violation Encoder 518 and IRIG de-randomizer 522 are generally understood by those skilled in the art, and in general are further detailed below.

Figure 6:
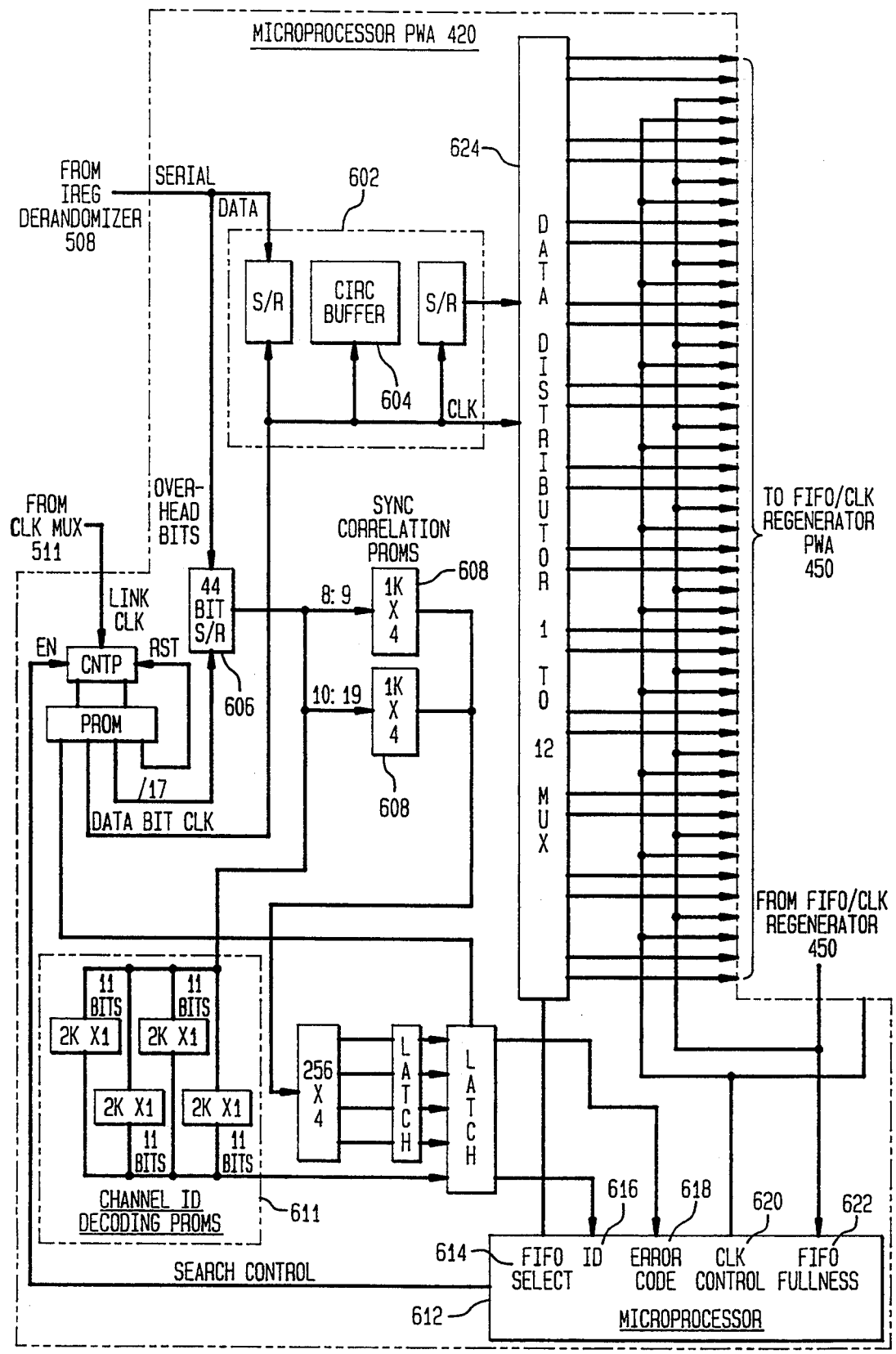
FIG. 6 is a simplified block diagram of a microprocessor circuit used in the demultiplexer of the present invention.

FIG. 6 shows the microprocessor PWA 420, which comprises a microprocessor 612 which operates on stored programs stored in read only memory 611.

The incoming link data are stored in a shift register 606. This information is used to address PROMs 608 which determine the bits in error in the synchronization pattern and decode the channel identification. This information is supplied to microprocessor and used to shift the correlation window in which the synchronization pattern is compared to that received by the data until coincidence is detected. The received data can be supplied to a one to twelve demultiplexer 624 for supply to buffers (FIG. 7) for storage of the individual packetized data.

Figure 7:
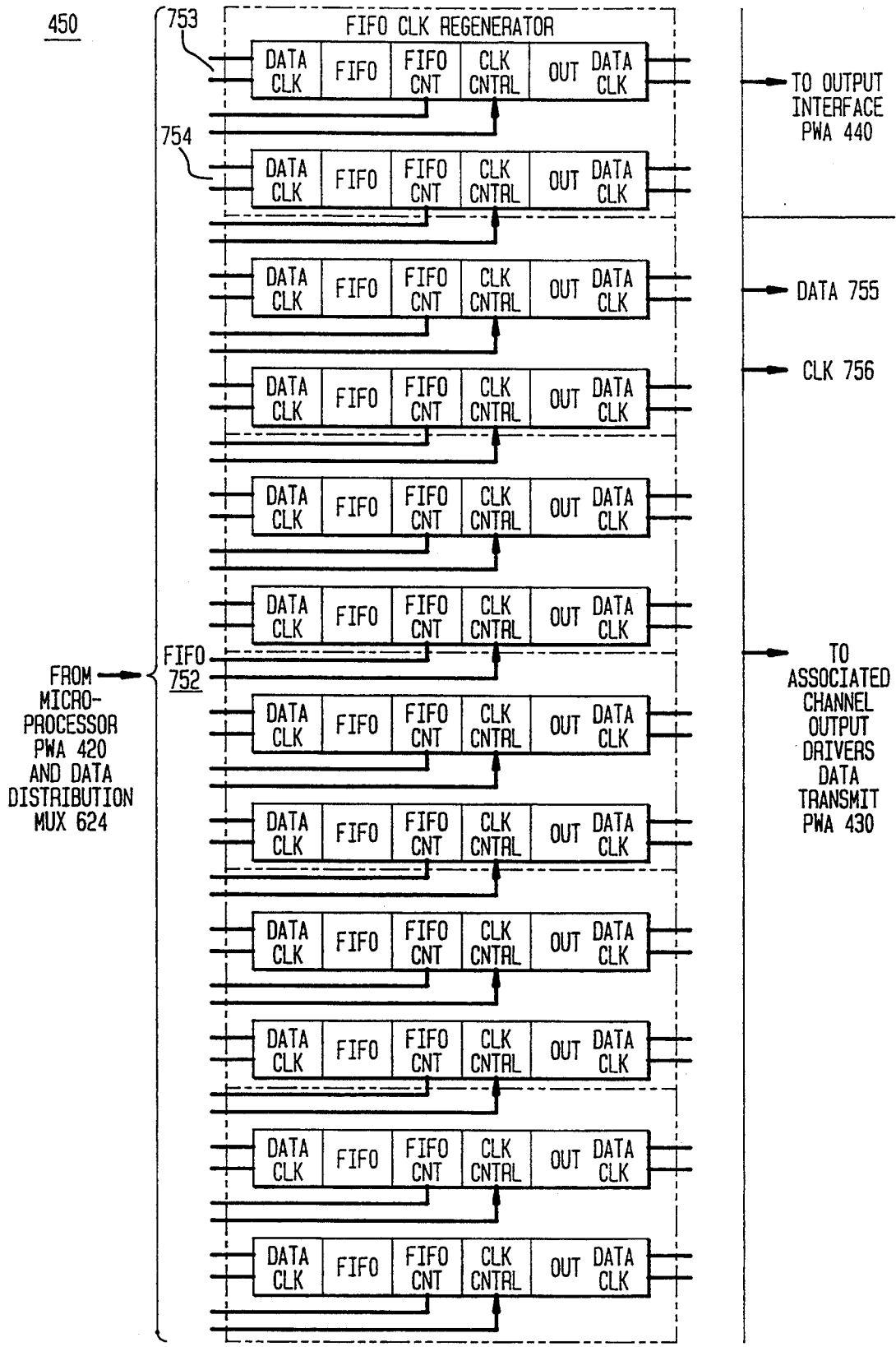
FIG. 7 is a simplified block diagram of a FIFO CLK regenerator used in the demultiplexer of the present invention.

FIG. 7 shows 12 FIFO's provided in the preferred embodiment of the invention. These are detailed below. Essentially the function of these FIFO registers 752 and the control registers associated with them is simply to store the packets of data and to gradually supply this data to output circuits (FIG. 8) for supply to associated data processing equipment. In this way, the packetized information received from the satellite downlink or other source is redivided into the original format of the messages received by the multiplexer 100.

Figure 8:
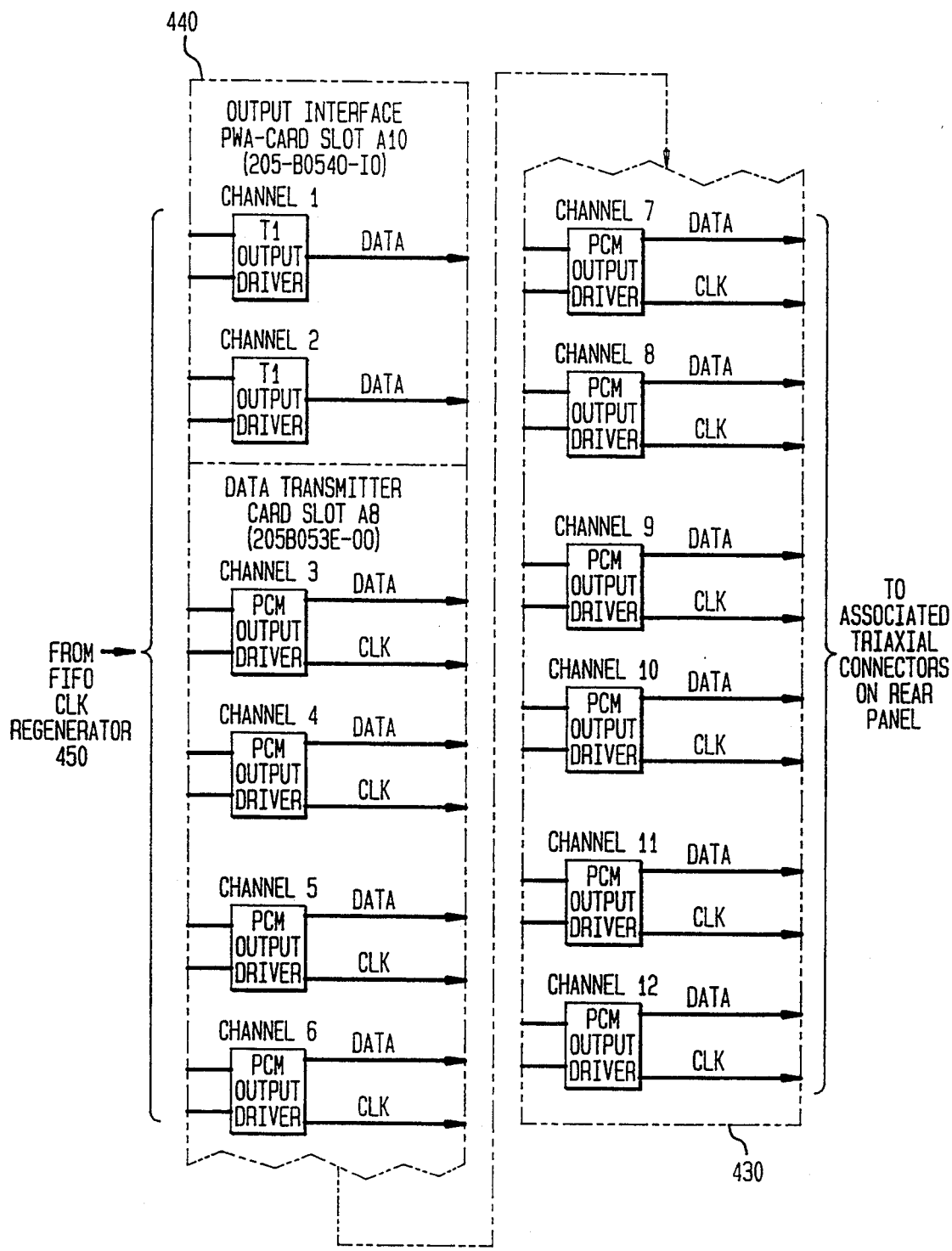
FIG. 8 is a simplified block diagram of the output interface and data transmitter used in the demultiplexer of the present invention.

FIG. 8 shows a number of output drivers 430 which are attached to the FIFO's of FIG. 7. In the preferred embodiment shown, the first two channels are T1 output drivers (that is, conform to the conventional T1 protocol) whereas channels 3-12 are pulse code modulated (PCM) output drivers. In each case, the output drivers provide the interface between the FIFOs 752 and any further processing equipment to which the demultiplexer 170 is connected.

5. MULTIPLEXER BLOCK DIAGRAM

Figure 9:
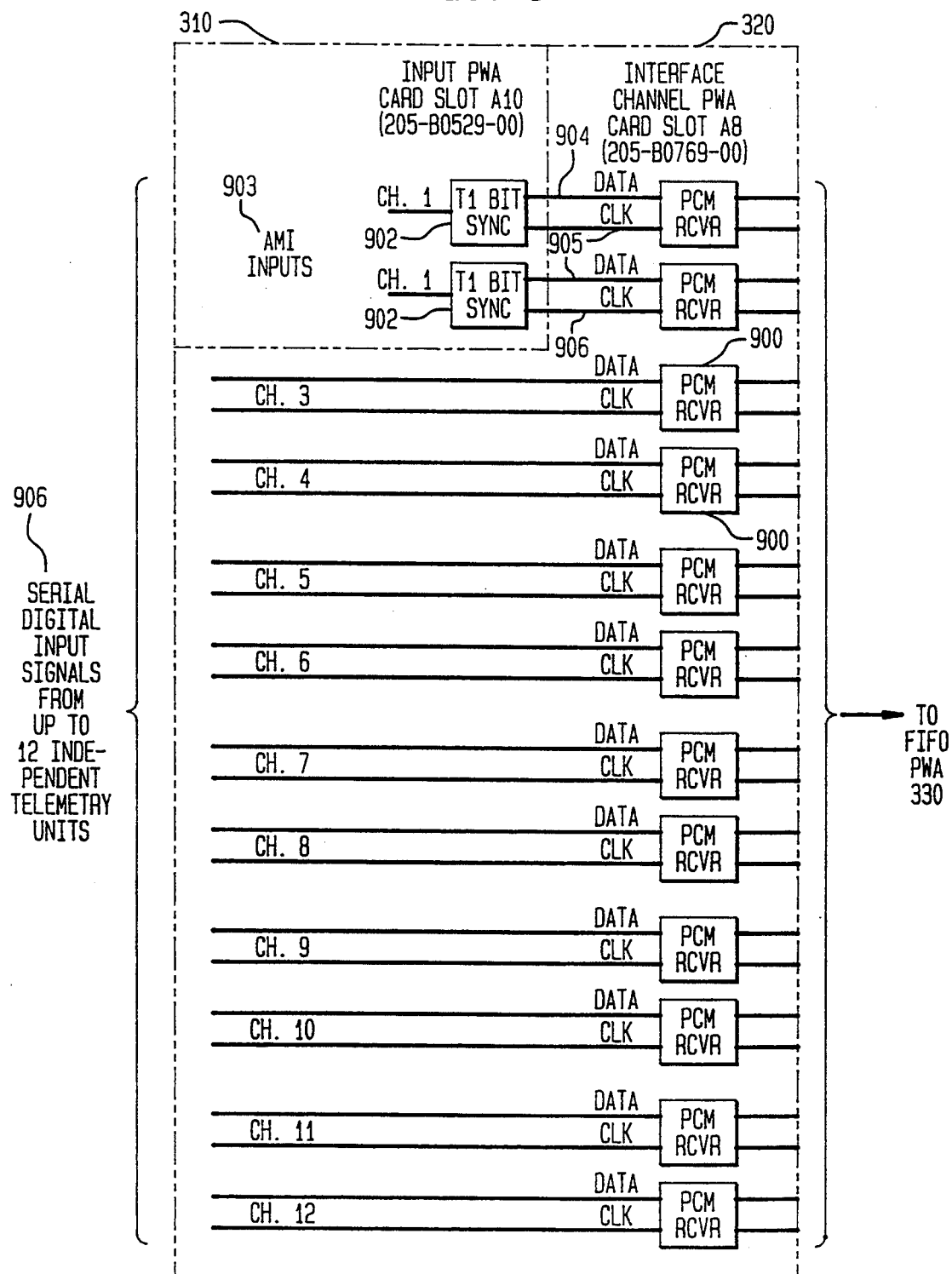
FIG. 9 is a simplified block diagram of the input circuit and channel interface used in the multiplexer of the present invention.

FIGS. 9 through 12 show in simplified block form the major elements of the multiplexer 100 according to the invention. These Figures can be arranged side-by-side for clarity. FIG. 9 shows the input circuitry by which a number of channels are connected to a variety of receivers 900. These may vary in accordance with the channels to which they are to connected; as indicated in FIG. 9, T1 data rate AMI input data may be processed somewhat differently than data from other sources. Such receivers 900 are therefore selected in accordance with the particular application to which the multiplexer is to be applied.

The input circuit of FIG. 9 feeds twelve FIFO's 1001 (FIG. 10) which store the data received from the individual channels until packets have been accumulated as described previously. At that time suitable header information is attached and the data is transmitted in the frame format shown in FIG. 2(b).

Figure 10:
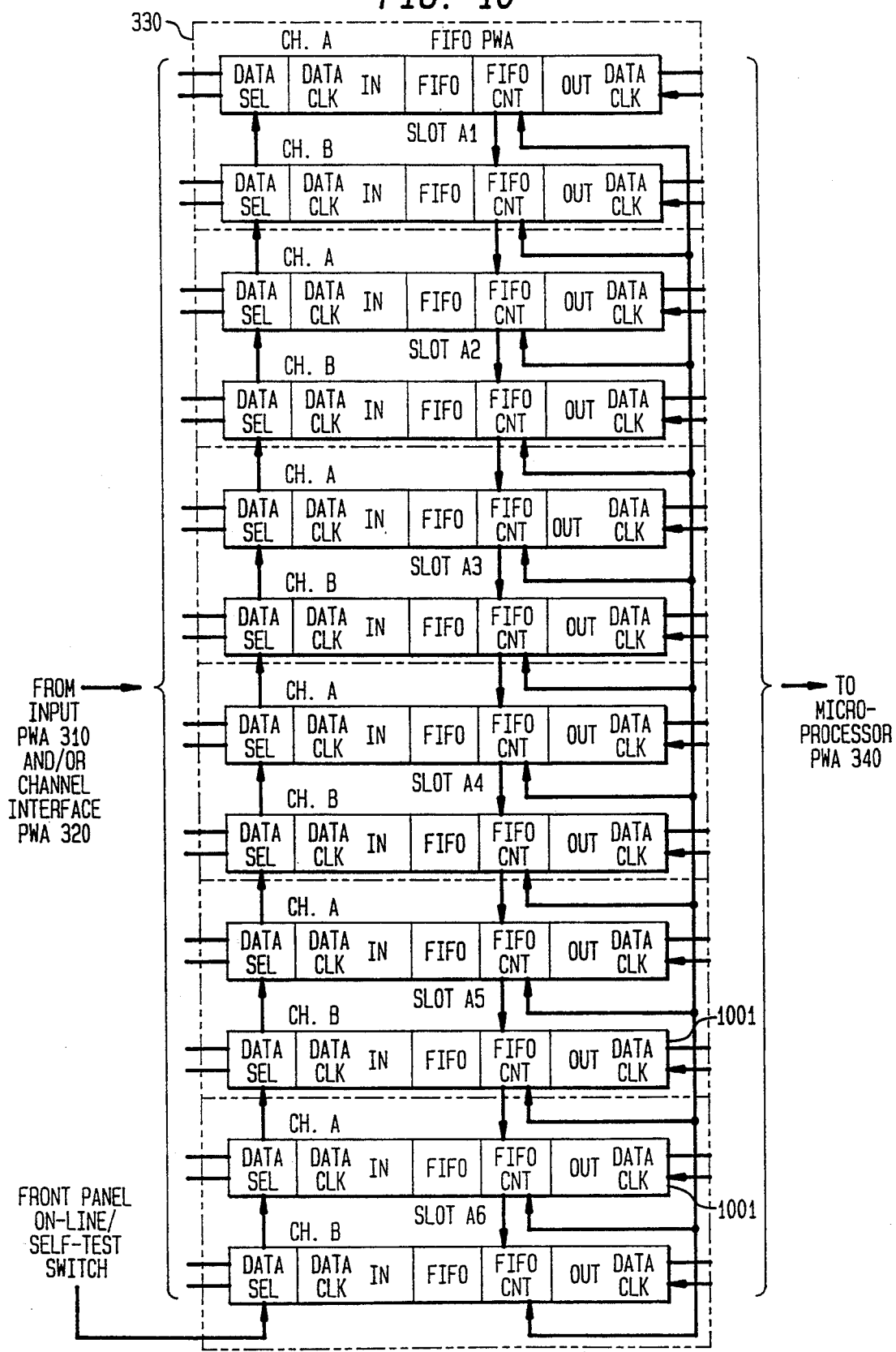
FIG. 10 is a simplified block diagram of a FIFO circuit used in the multiplexer of the present invention.
Figure 11:
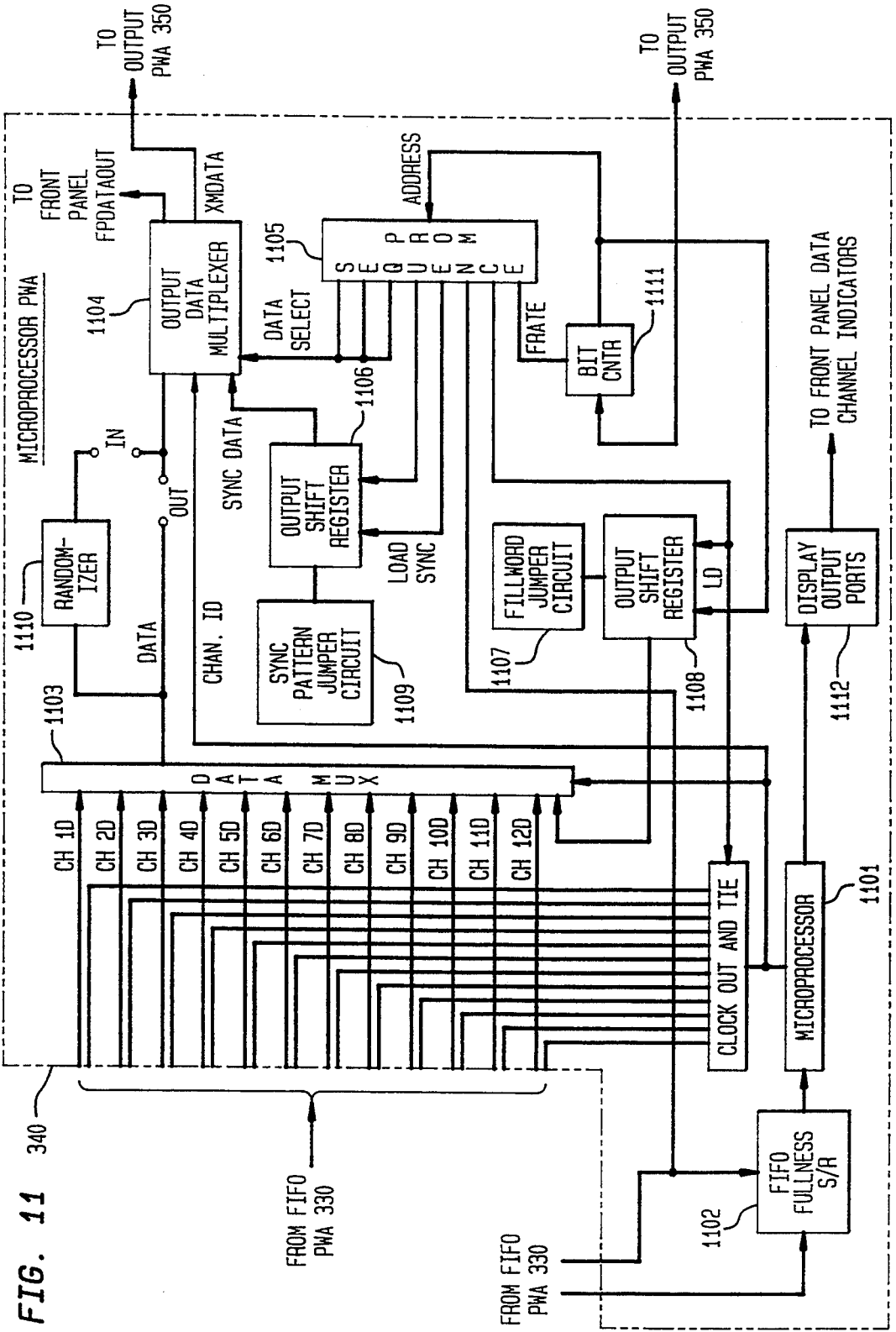
FIG. 11 is a simplified block diagram of a microprocessor circuit used in the multiplexer of the present invention.

FIG. 11 shows the microprocessor circuit 340 of the multiplexer of the invention. Microprocessor 1101 controls transmission of packets of data between the FIFO's 1001 and FIG. 10 and the output circuit 1104 via a multiplexer 1103. Microprocessor 1101 monitors FIFO fullness by monitoring the signals received from the FIFO PWA of FIG. 10. As mentioned, it is preferred to transmit only full packets of data to maximize the efficiency provided by reducing overhead by transmitting long packets.

The actual format of the transmitted signal is controlled by a sequence contained in a PROM 1105 which as indicated feeds an output shift register 1106, a sync pattern generator circuit 1109, and the output data multiplexer, which multiplexes the data stored in the FIFO's of FIG. 10 with the synchronization and link identification information, as discussed in connection with FIG. 2.

Figure 12:
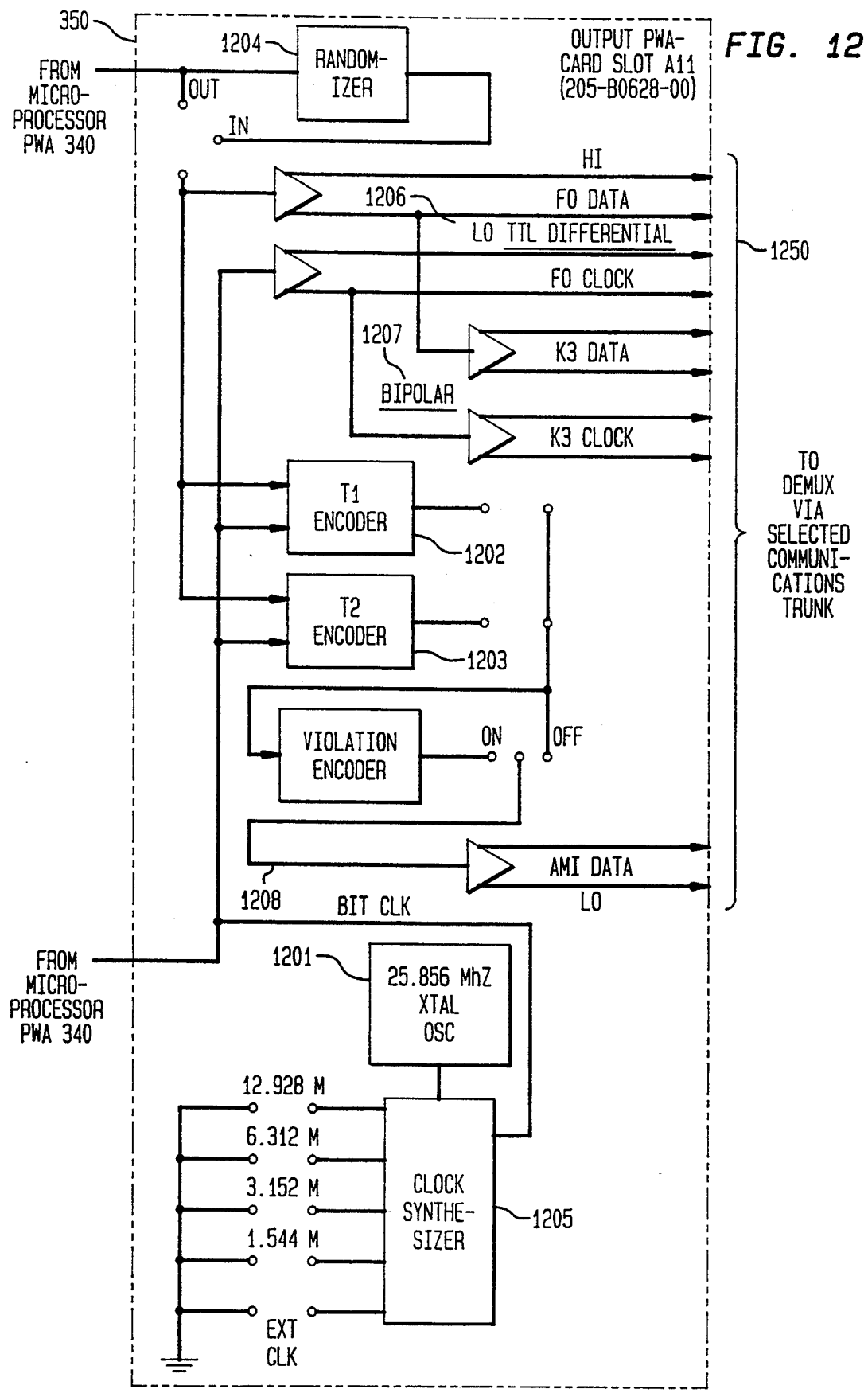
FIG. 12 is a simplified block diagram of an output circuit used in the multiplexer of the present invention.

Finally, FIG. 12 shows the output circuit, which includes a randomizer 1204 that randomizes the data in accordance with conventional practice where needed. The output data is sent via one of a number of output lines indicated generally at 1250 to whatever transmission medium is employed. As indicated, a number of different output formats are supported in the preferred embodiment of the invention in order to readily interface this unit with various types of transmission media as may be convenient for the user.

As discussed in connection with the demultiplexer 170, other elements shown on these drawings are generally conventional and are described in further detail below.

II. DETAILED FUNCTIONING OF THE MULTIPLEXER

This section provides detailed information regarding the operation of the circuits on each major section (PWA) of the multiplexer of the present invention. Detailed block diagrams are provided for each assembly shown on the simplified block diagram of FIG. 3.

1. INPUT PWA 310 BLOCK DIAGRAM DESCRIPTION (FIG. 13)

Figure 19B:
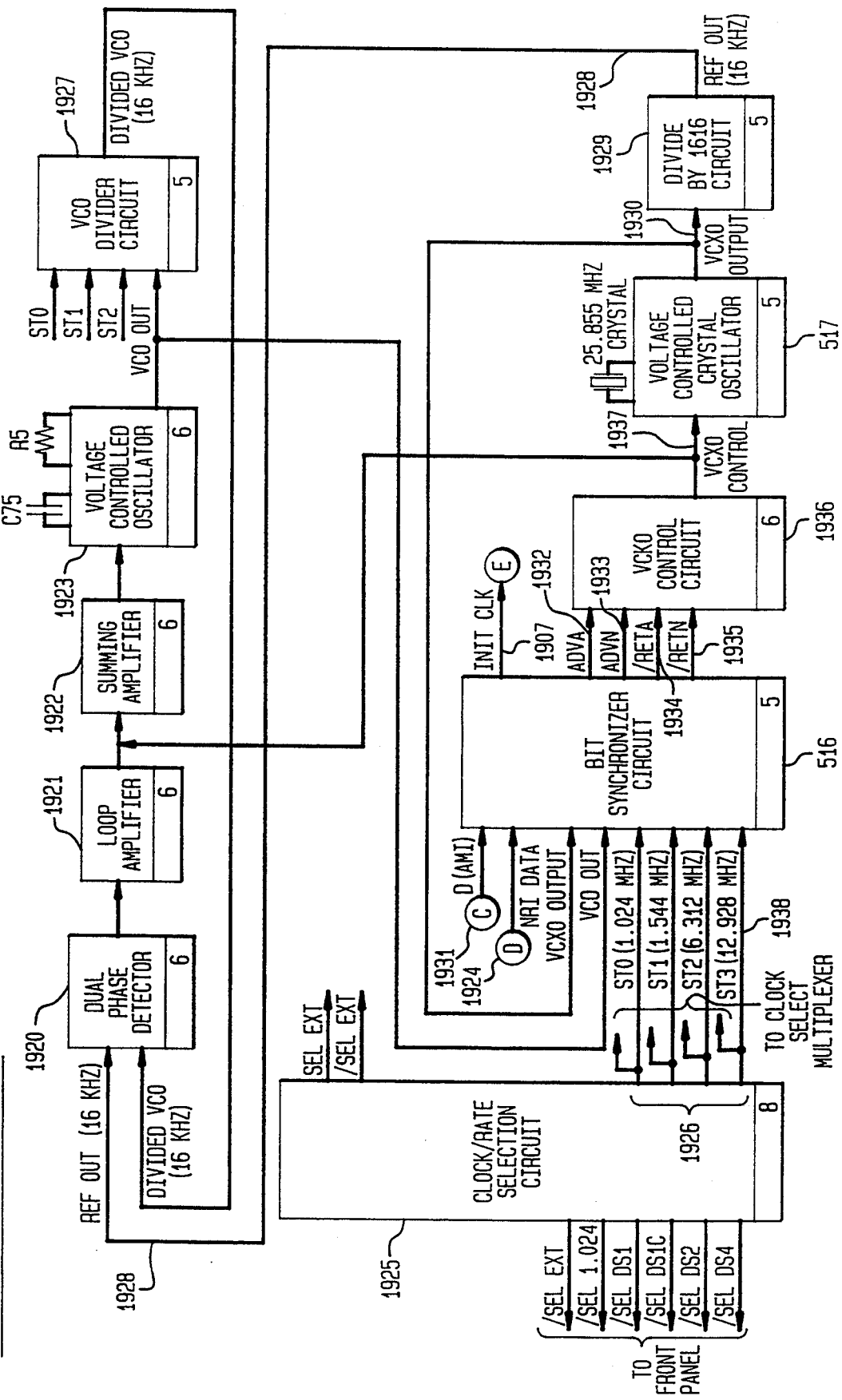
FIG. 19 is a detailed block diagram of the bit synchronizer of the demultiplexer of the present invention.

The input PWA provides two identical AMI (Alternative Mark Inversion) input channel circuits designated Channel 1 1301 and Channel 2 1302. Both channels are used to process AMI incoming bipolar data streams and are identical except for minor differences that may exist at their inputs due to impedance matching requirements of the transmission lines connected to them (not shown). The output of each channel is connected to the respectively numbered channel on Channel Interface PWA 320 (FIG. 19).

Figure 13:
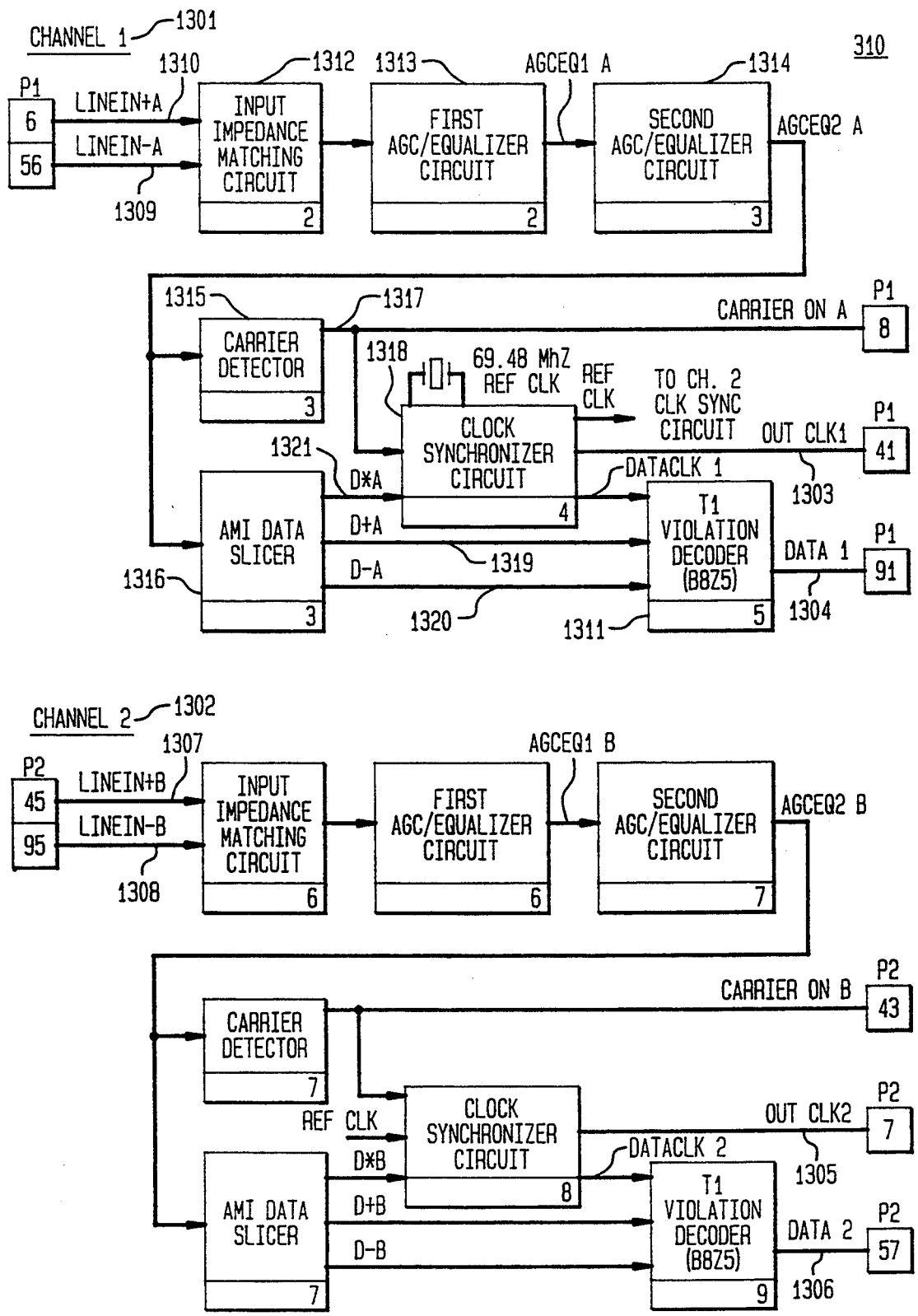
FIG. 13 is a detailed block diagram of an input circuit used in the multiplexer of the present invention.

During the following discussions, refer to the Input PWA detailed block diagram given in FIG. 13. Since Input Channels 1 and 2 are almost identical, only the circuits of Input Channel 1 (1301) will be described.

Channels 1 and 2 are used to produce separate NRZ-L data and clock signals on lines 1303 through 1306 at 1.544 Mbits/second, the incoming AMI encoded signal is on lines 1307 through 1310. A clock is embedded in the data stream for processing by the circuits of the FIFO PWA 330. The nature of the AMI input signal is described as follows. At the remote or transmit end, a 1.544 Mb/s data stream (not shown) is converted into a stream of alternating polarity pulses such that any DC component in the data is suppressed. Each mark, or '1', is encoded as a pulse of polarity opposite to the last pulse transmitted. A space, or '0' results in no pulse being transmitted unless eight or more occur consecutively. In this case a specific 'violation code' is sent.

As shown in the block diagram, the AMI input signal on lines 1309 and 1310 is first applied to an Input Impedance Matching circuit 1312. Impedance Matching Circuit 1312 provides interface through a line transformer (not shown) which must be terminated to match the impedance of the input transmission lines.

The input signal is routed to two equalizer/AGC stages 1313 and 1314 to cancel the effects of the attenuation of the signal from the transmission line. First and second AGC/equalizer circuits 1313 and 1314 contain two high-gain amplifiers (not shown) to compensate for high frequency losses in the transmission line and to improve the overall condition of the signal. A level detector (not shown) may be employed to limit the maximum output level provided.

The amplified and conditioned AMI signal is then applied to the Carrier Detector circuits 1315 and to the AMI Data Slicer circuit 1316. Carrier Detector 1315 is used to sense input data activity and to provide an output signal (CARRIER ON A) on line 1317 to Clock Synchronizer circuit 1318 to enable the output clock via line 1303.

AMI Data Slicer circuit 1316 slices the applied AMI signal 1309, 1310 into positive and negative pulses on lines 1319 and 1320. The two pulse streams are routed to a T1 Violation Decoder (1311) which buffers and combines them into a single output on lines 1304 and also detects violation codes that represent groups of eight consecutive zeroes; the output of T1 Violation Decoder 1304 (DATA 1) is the NRZ-L data stream which is applied to the Channel 1 data input of Channel Interface processing circuit of FIG. 14.

Figure 14:
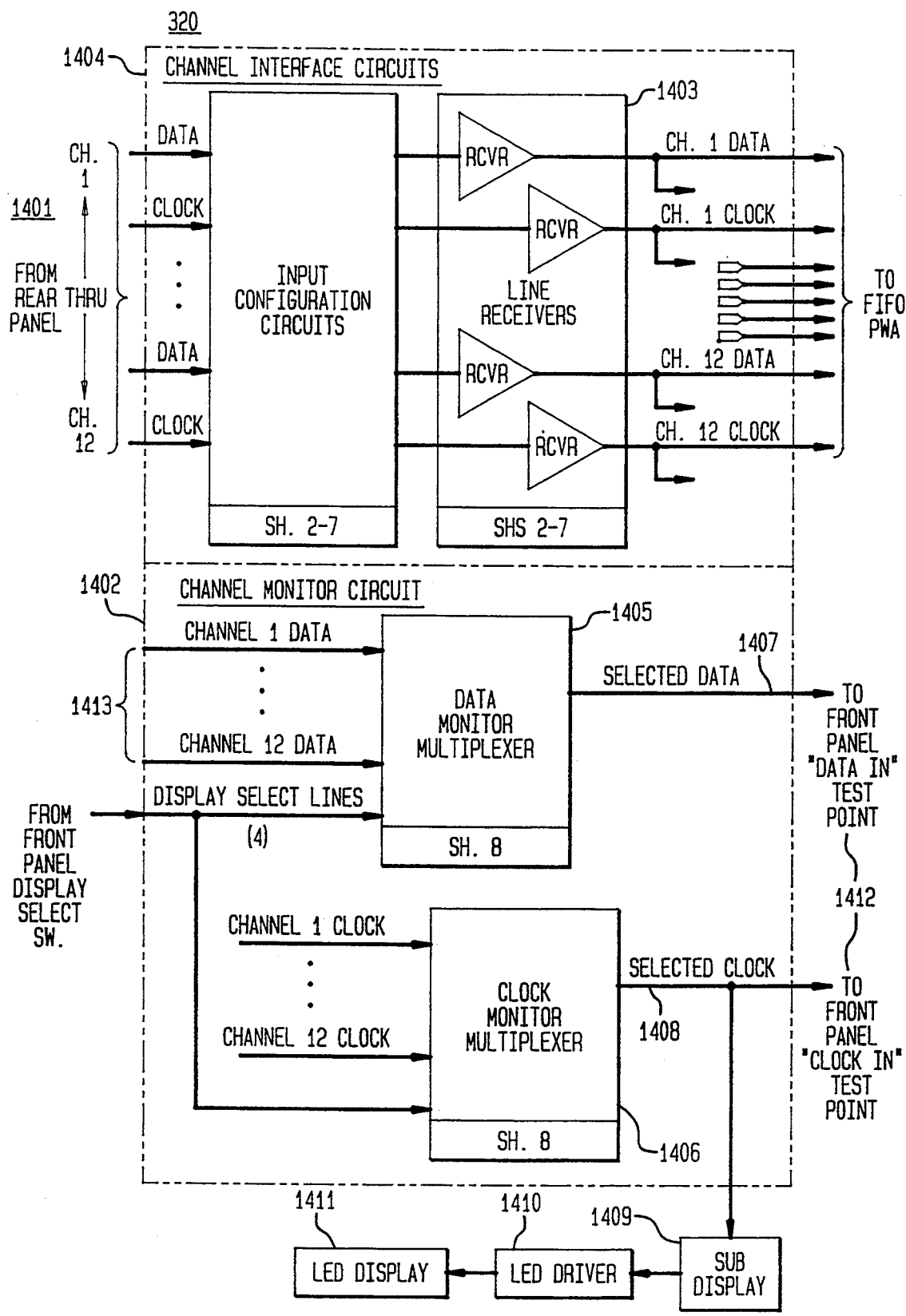
FIG. 14 is a detailed block diagram of the channel interface circuit used in the multiplexer of the present invention.

The data output of Channel 2 (DATA 2) 1302 is applied to the Channel 2 data input of the Channel Interface circuit of FIG. 14.

The positive 1319 and negative 1320 pulse outputs of AMI Data Slicer 1316 are also OR-ed (in a gate which is not shown) to provide a composite data input signal (D A) on line 1321 to Clock Synchronizer circuit 1318. Clock Synchronizer 1318 includes a 69.48 MHz oscillator (not shown) for use in deriving the 1.544 Mb/s clock signal for the converted data stream. When an AMI data stream is detected, the CARRIER ON A output from Carrier Detector 1315 enables the gate used to output the clock rate as signal OUT CLK1 on line 1303. OUT CLK1 is thus the clock signal which accompanies the processed data of the present invention. OUT CLK1 is applied to the Channel 1 clock input 1401 of the Channel Interface PWA 320 (FIG. 14) for processing.

The clock output of Channel 2 (OUT CLK2) on line 1305 is similarly applied to the Channel 2 clock input 1402 of Channel Interface PWA 320.

2. CHANNEL INTERFACE PWA 320 (FIG. 14)

Channel Interface PWA 320 provides 12 channel circuits 1401, designated Channels 1 through 12, which are used to process NRZ-L data streams. All channels are identical except for minor differences that may exist at their inputs for compatibility with the transmission lines (not shown) that connect to them. Also provided is a channel monitor circuit 1402 that allows the activity on any channel to be monitored.

During the following discussion, refer to the Channel Interface PWA 320 detailed block diagram given in FIG. 14.

Operation of Channel Interface Circuits

The receiver circuits for all twelve channels 1401 are provided by six IC chips (Advanced Micro Devices type AM26LS32 or equivalent) each of which provides four differential line receivers 1403. Two receivers are used per channel, one for data and one for clock signals. Line receivers 1403 are designed to meet the requirements of RS-232, RS-422 and RS-423, and Federal Standards 1020 and 1030 for balanced and unbalanced digital data transmission. The input circuit to each line receiver 1403 is designed to allow it to be properly configured for the appropriate type of input signal to be applied.

All line receivers 1403 feature an input sensitivity of 200 mV over the input voltage range of ±7 V. The output of each line receiver 1403 is routed to Channel Monitor circuit 1402 and to its associated FIFO PWA channel 330 for further processing.

Operation of Channel Monitor Circuit

The data and clock outputs 1413 of the 12 channel receivers are also routed to Data Monitor multiplexers 1405 and Clock Monitor Multiplexer 1406 to enable any channel's data and clock signals 1401 to be selected and applied to test points 1412 of the present invention for monitoring purposes.

Data outputs are applied to Data Monitor multiplexer 1405 while the clock outputs are applied to clock monitor multiplexer 1406. The primary output of multiplexers 1405 and 1406 is connected to a test point (DATA IN or CLK IN) 1412 on lines 1407 and 1408.

The output of clock monitor multiplexer 1406 is also applied to a frequency counter (not shown) located on the sub-panel Display 1409 which decodes the selected channel frequency. The frequency decoded is applied to an LED driver circuit 1410 for front-panel display by LED display 1411. The range of the frequency counter allows display of a frequency from 100 Hertz to approximately 12.9 MHz in the preferred embodiment of the present invention.

3. FIFO PWA 330

FIFO 330 comprises two identical circuits, designated Channel A 1501 and Channel B 1502, for processing both data and clock signals received from Channel Interface PWA 330.

Since Channels A and B are identical, only the circuits of Channel A 1501 are described.

On Line/Self Test Data Selection

Figure 15A:
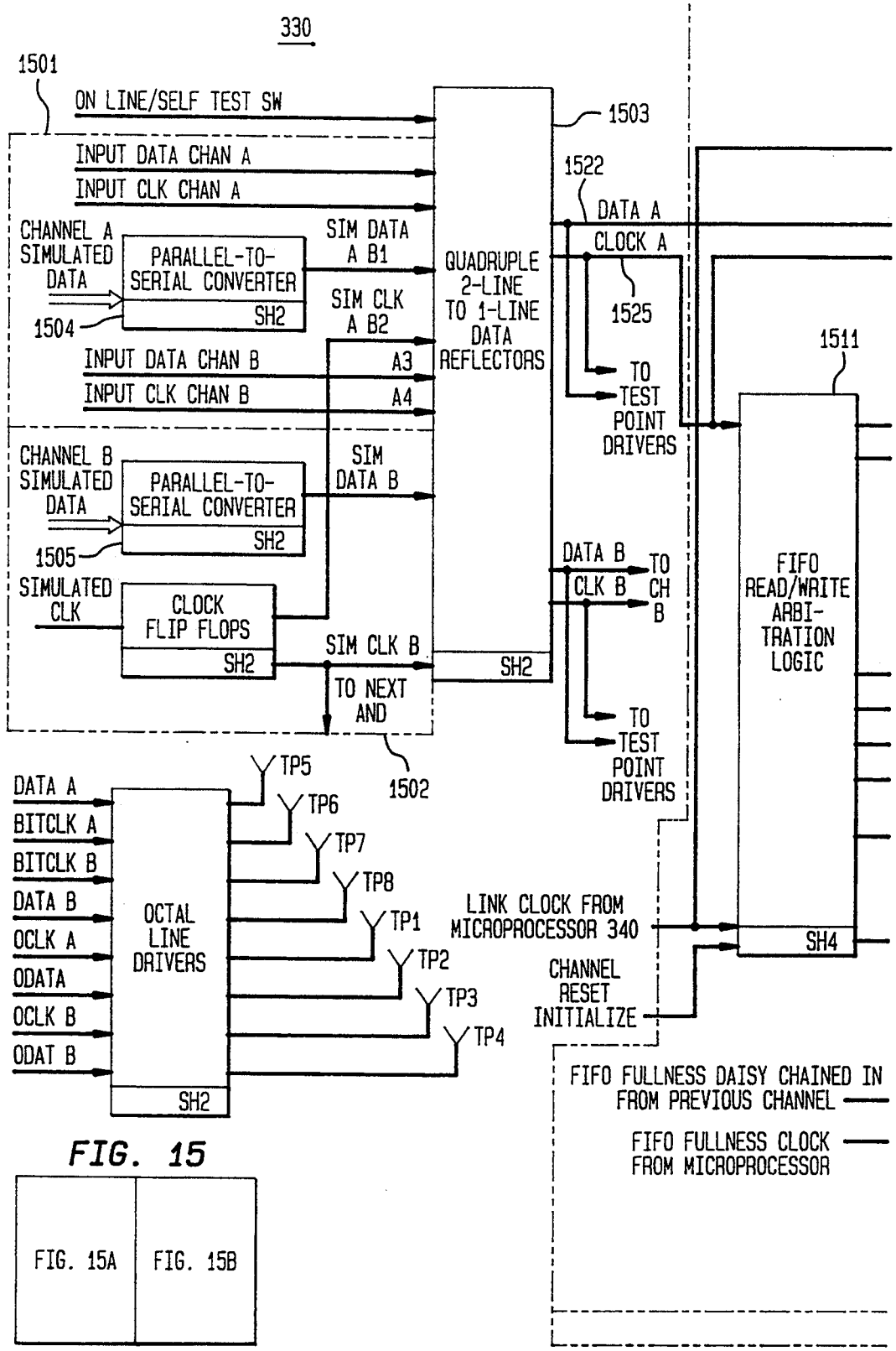
FIG. 15 is a detailed block diagram of the FIFO circuit used in the multiplexer of the present invention.
Figure 15:
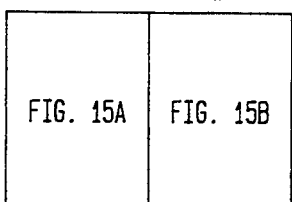
Figure 15B:
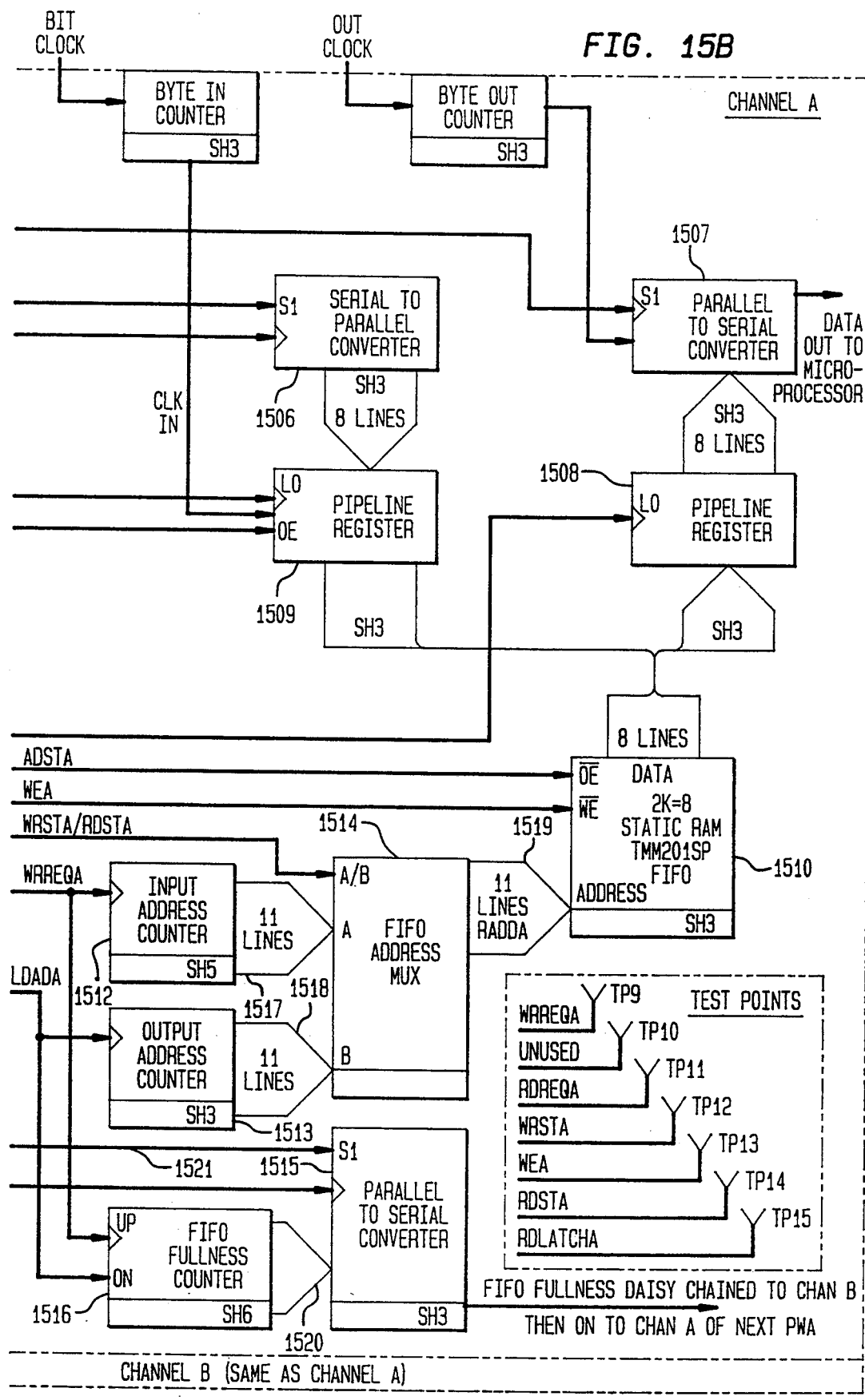

As shown in FIG. 15, a quadruple 2-line to 1-line data selector circuit 1503 is provided at the input to channels A and B 1501 and 1502, to allow selection of either on-line data and clock signal received from the Channel Interface PWA 320 or simulated data and clock signals generated by on-board self-test circuitry (not shown).

The simulated test data for Channels A 1501 and B 1502 are received via two parallel-to-serial converters 1504 and 1505 whose inputs enable an output that simulates the tested channel's 4-bit channel ID code (not shown). When converters 1504 and 1505 are enabled, the channel's ID code is continuously output. The simulated clock signals are enabled as submultiples of the link output clock, (from the Microprocessor PWA 340) ranging from ¼ (first channel) to 1/8192 (twelfth channel) of the selected link bit rate received from the Output PWA 350.

Data Processing

The FIFO's 1510 used in the multiplexer of the present invention delay and exercise control over the serial input data as follows. Serial data on line 1522 is first converted to parallel format by serial to parallel convertor 1506 for storage and then, on a priority basis, parallel-to-serial converted by parallel to serial converter 1507 for transfer to microprocessor PWA 340. The data is first routed to an 8-bit serial-to-parallel converter 1506 where it is clocked in at the input channel clock rate from Data Selector 1503. The input channel clock on line 1525 is also applied to an eight-bit counter circuit (not shown) to generate the clock signal write request to load the output (8 bits) from the serial-to-parallel converter 1506 into 8-bit pipeline register 1509. As every eighth bit is detected, the data are loaded into pipeline register 1504 and then rippled into the FIFO 1510 which is a 2K×8-bit static RAM.

The channel clock on line 1525 is also applied to read/write arbitration logic 1511 along with the output clock signal generated on Microprocessor PWA 340. The output clock signal is derived from the link bit rate and is active only when the particular channel is to be multiplexed onto the interconnecting link (not shown).

Since the channel input clock and the microprocessor output clock are asynchronous, access to the FIFO 1510 address and data bus 1519 must be arbitrated to avoid contention. All the timing signals needed for write and read operations are generated by Read/Write arbitration logic 1511.

Generation of the address signals for accessing FIFO 1510 is accomplished using two counter circuits, one for input addressing (i.e. writing to FIFO 1510) and one for output addressing (reading from FIFO 1510). Input address counter 1512 is incremented as each byte of data (not shown) is written into FIFO 1510 while output counter 1513 is incremented as each byte is read out of FIFO 1510. The eleven outputs 1517 from input address counter and the eleven outputs 1518 from output address counter 1513 allow addressing of all of the 1024 bytes of FIFO 1510. The outputs of counters 1512 and 1513 are applied to separate registers in FIFO address MUX 1514. The outputs of FIFO address MUX 1514 are connected via lines 1519 to the FIFO 1510 address lines (not shown). Write and read enable signals generated by arbitration logic 1511 determine which counter output is enabled to FIFO 1510. When the outputs of either input address counter 1512 or output address counter 1513 is enabled, that of the other will be inhibited and a high impedance provided.

FIFO Fullness Circuitry

The FIFO fullness measurement circuit comprises FIFO fullness counter 1516 and parallel to serial convertor 1515. The FIFO fullness circuit monitors the fullness of the FIFO 1510. The output of this circuitry is a 12-bit word that is subsequently read by the microprocessor 1101 to determine the order of priority for the channels to be multiplexed. FIFO fullness counter 1516 is a 12-bit up/down counter that is incremented as each byte is written into FIFO 1510 and decremented as each byte is read out of FIFO 1510. The twelve output lines 1520 of FIFO fullness counter 1516 are applied to parallel-to-serial convertor 1515 along with the output 1521 from the previous FIFO PWA (not shown). The output from parallel to serial convertor 1515 is routed to the FIFO fullness circuit of the next channel. In this manner, the FIFO fullness circuits of all 12 channels are daisy chained together to form one shift register and thus eliminate the problems inherent in wide parallel data buses and fanouts. The daisy chain allows the FIFO fullness data from all 12 channels to enter microprocessor 1101 on one serial line. Microprocessor 1101 performs comparisons between the FIFO fullness data received from the various channels to establish which channel's data is to be transmitted from the appropriate FIFO 1510 in the next frame time.

4. MICROPROCESSOR PWA 340 (FIG. 16)

Figure 16B:
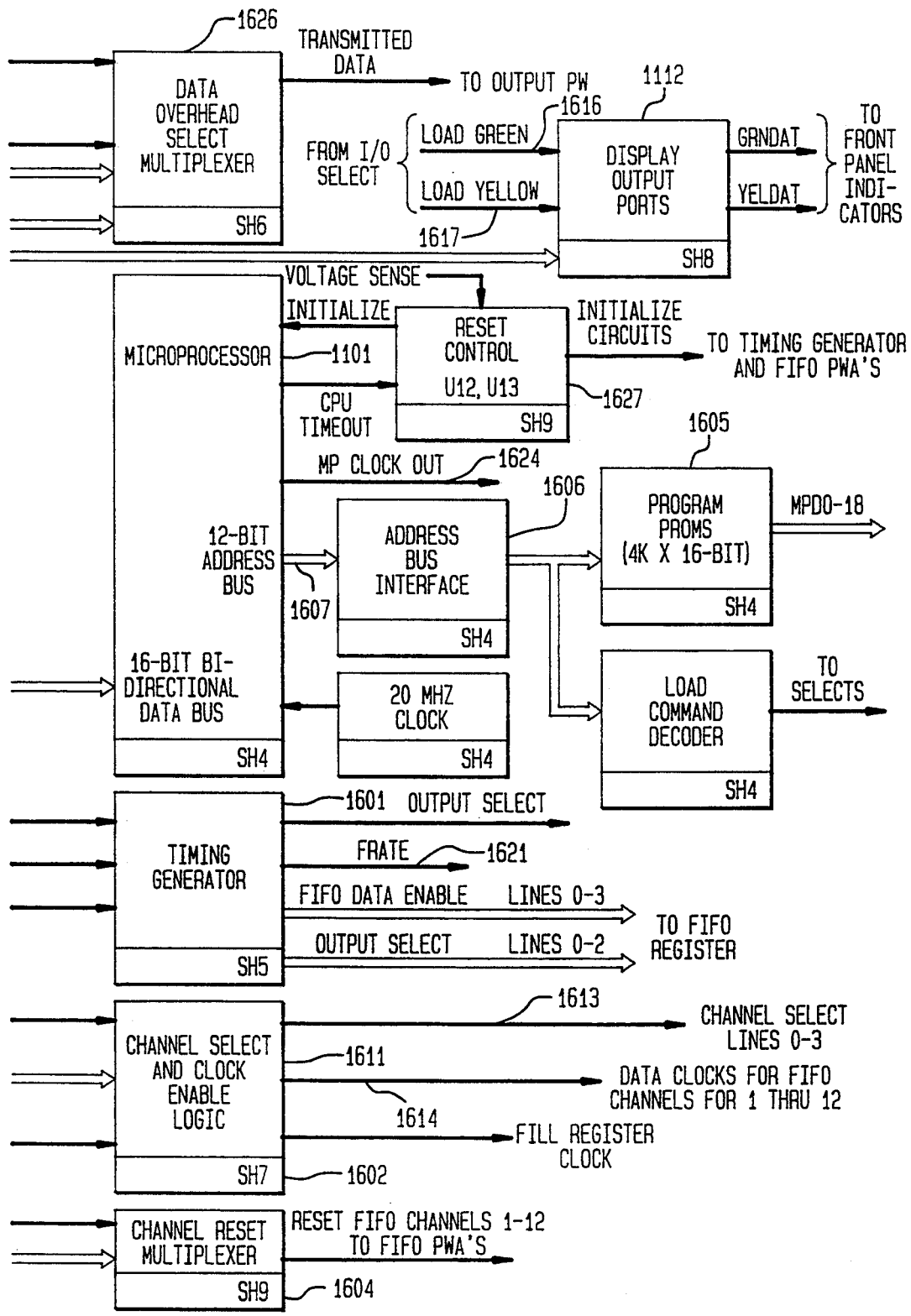
FIG. 16 is a detailed block diagram of the microprocessor circuit used in the multiplexer of the present invention.

During the following discussion, refer to the Microprocessor PWA detailed block diagram given in FIG. 16.

Functionally, the Microprocessor PWA 340 is divided into two sections, the Timing Generator section and the Microprocessor section.

Timing Generator

Figure 18:
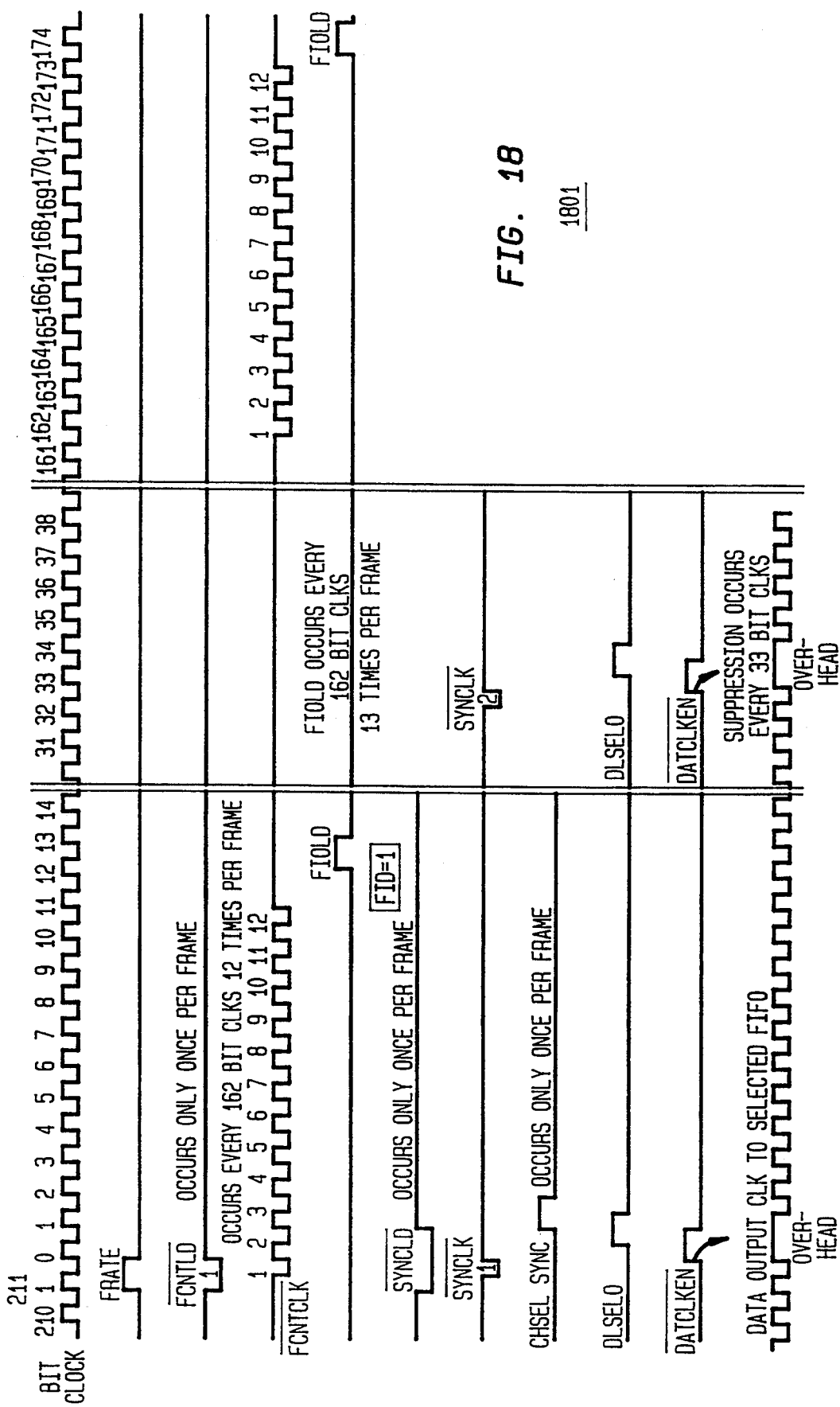
FIG. 18 illustrates the timing diagram of the operation of the microprocessor of the multiplexer of the present invention.

Generally stated, the Timing Generator section provides all the circuits required to generate the load, clocking, and interrupt signals required to perform the multiplexing function, that is, combining the data from a channel with the overhead bits 260 needed to generate the output frame format 210 illustrated in FIG. 2. A timing generator 1601 provides timing and clock signals shown on lines 1801 (FIG. 18). These signals 1801 are needed for operation of the microprocessor 1101 and to clock the data through the channel selector circuits 1602 and out of FIFO memories 1510 located on FIFO PWA 330. In addition, Timing Generator 1601 provides the timing signals needed to load, select, and clock the data, sync, fill, and channel ID register outputs into the composite serial output stream for transmission to Output PWA 330. Refer to the timing diagram given in FIG. 18, which illustrates the timing and clock signals to be correlated with microprocessor PWA 340 illustrated in FIG. 16.

Timing Generator 1601 comprises counters, sequencing PROMS, and latches (not shown). The counters comprising timing generator 1601 are incremented by the link bit rate clock 1603 which is derived from the selected link frequency (DS-1 at 1.544 Mb/s, DS-1C at 3.152 Mb/s, DS-2 at 6.312 Mb/s, or DS-A at 12.928 Mb/s) of the input signals to be multiplexed by the system of the present invention. Link bit rate clock 1603 signal 1603 is received from crystal controlled oscillator 1201 located on Output PWA 350. Outputs of the counters (not shown) within timing generator 1601 address a 4K deep PROM (not shown) that is 16-bits wide (formed by two 4K×8-bit PROMs). The PROM outputs are latched by a latch circuit (not shown) within timing generator 1601 that is also clocked by the link bit rate clock 1603. This eliminates the transitions that would otherwise occur during the access time of the PROMs within timing generator 1601. A second latch circuit (not shown) is clocked from the trailing edge of the link bit rate clock 1603 to allow setup time for synchronous loading.

Microprocessor Circuit

The Microprocessor section includes microprocessor 1101, program PROMs 1605, and I/O ports 1606. Due to hardware restrictions, microprocessor 1101 and timing generator 1601 operate at different frequencies. Microprocessor 1101 operates at a frequency of 20 MHz enabled by an on-board crystal controlled oscillator (not shown) while timing generator 1601 operates at the selected link bit clock frequency (signal 1603) received from the crystal controlled oscillator 1201 located on Output PWA 350.

In the preferred embodiment of the present invention, Microprocessor 1101 is a Texas Instruments TMS32010 which features a 16-bit data bus structure, a 12-bit address bus, a 5 MHz instruction rate for most instructions, an internal 16-bit multiplier, and sufficient internal operating memory to eliminate the need for additional external operating memory. Reset control circuit 1627 monitors operating power. Should the operating voltage fall below the minimum acceptable limit, initialize signals are generated to reset microprocessor 1101, timing generator 1601, and each of the twelve FIFO channels enabled in FIFO PWA 330 (FIG. 10).

The operating program for microprocessor 1101 is stored in two external 4K×8-bit PROMs (Program PROMs 1605) interfaced to microprocessor 1101 via its 16-bit bi-directional data bus and address bus interface 1606.

Three of microprocessor's 1101 twelve address lines 1607 are used to provide the capability to select up to eight input and eight output ports. For example, one input port enable signal is used to enable the FIFO fullness count from each of the twelve FIFO channels (from FIFO Fullness Registers 1102) onto the microprocessor data bus 1609. Another signal is used to enable the count which is used to determine the bit rate of the selected link frequency onto the microprocessor data bus 1609.

Microprocessor 1101 provides an output enable signals termed Load Channel Select 1612, which is used to select the channel to be multiplexed to the output via Channel Select Lines 1613. The selected channel ID is also output by microprocessor 1101.

Microprocessor 1101 receives FIFO fullness data from each of the twelve FIFO channels shown on FIFO PWA, FIG. 10, via the FIFO fullness serial-to-parallel converter, register 1506. (As mentioned above, the FIFO fullness outputs from all twelve FIFO channels are daisy chained together to allow their data to enter this port as a serial stream.) FIFO fullness register 1102 converts the serial FIFO fullness data into parallel words for use by microprocessor 1101 in determining the channel priorities of the present invention.

When none of the input channels, as determined by microprocessor 1101, has sufficient data stored to transmit a complete data packet for the upcoming frame 210, the present invention transmits what is termed as a 'fill data packet' (not shown) in place of a dynamic data packet, along with an ID code that identifies the fill frame. The fill packet consists of a fixed 16-bit data pattern which is repeated twice per word for a total of 128 times per frame, that is, 2048 bits. The fill packet is transmitted in the same manner as the dynamic data, along with the fill frame ID code, and the normal synchronization pattern.

5. OUTPUT PWA 350

Output PWA 350 contains a clock synthesizer circuit 1205, which produces the proper (selectable) link operating frequency, along with the link output circuits 1701, which perform the signal conversion and amplification needed to interface the TTL output (data streams) of Microprocessor PWA 340 with the selected-output device. The data streams received from Microprocessor PWA 340 are conditioned by three different output circuits (for example, balanced differential driver, TTL and bipolar) having different signal characteristics to match the desired transmission medium.

Clock Synthesizer Circuit

Figure 17A:
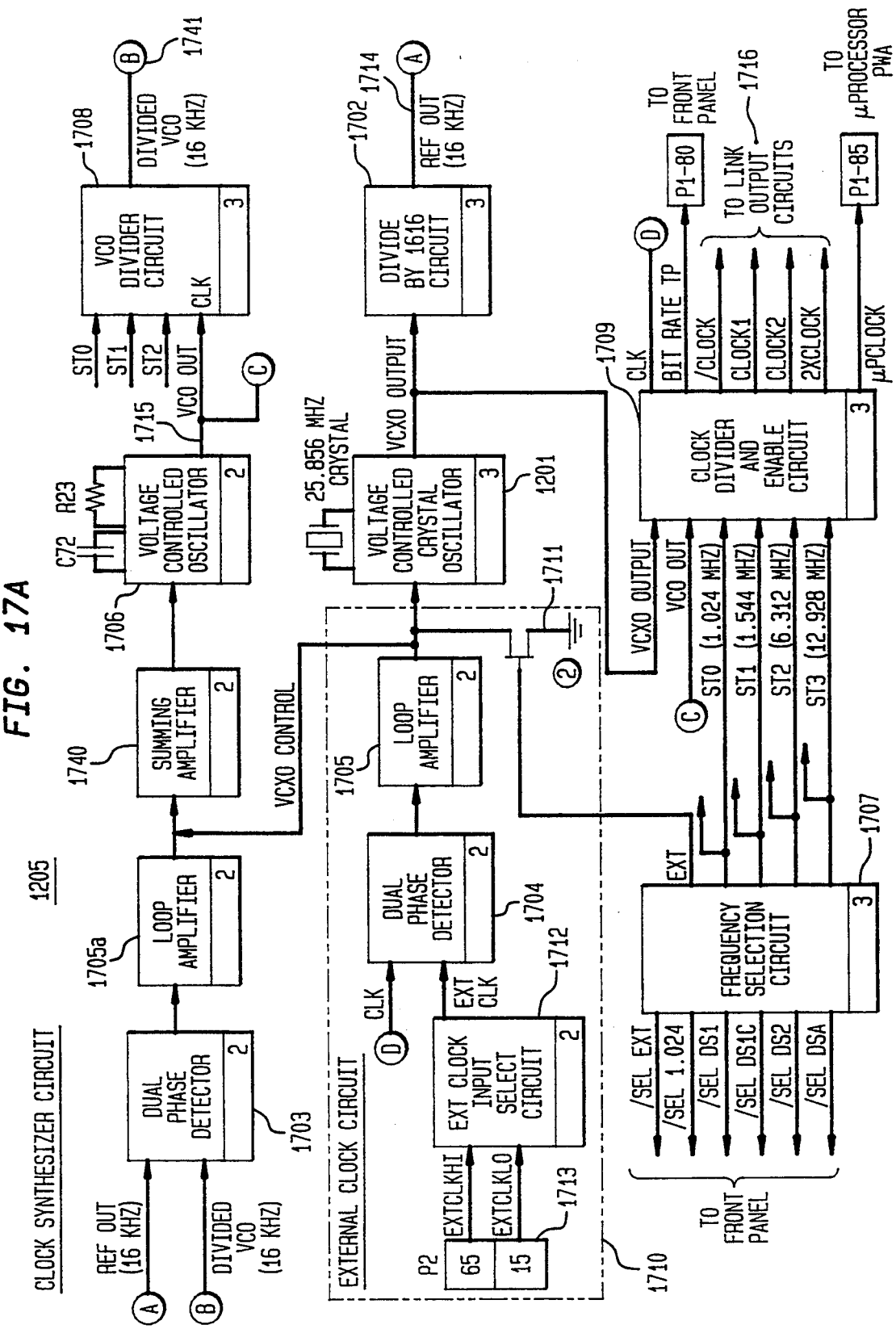
FIG. 17 is a detailed block diagram of the output circuit used in the multiplexer of the present invention.
Figure 17B:
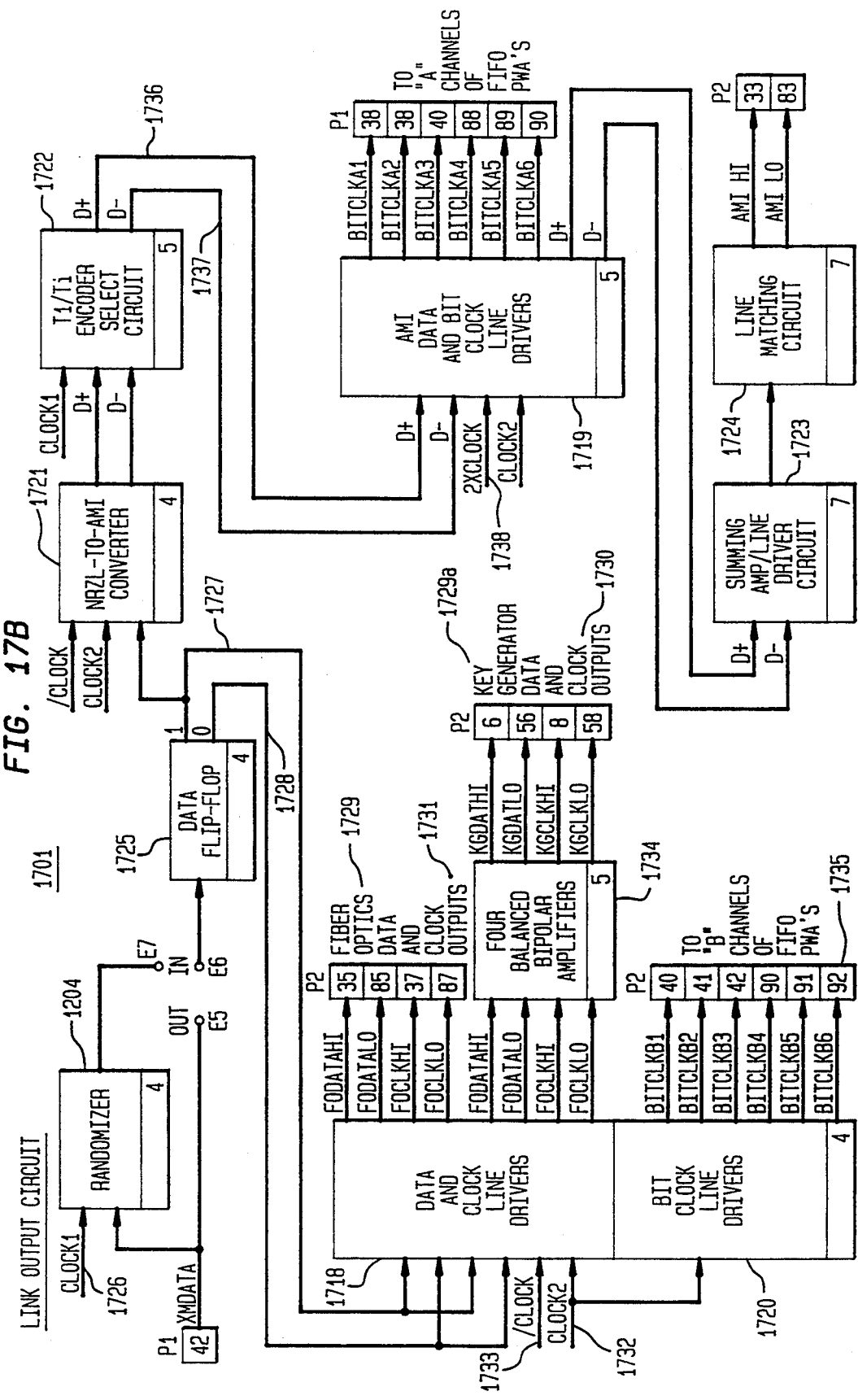

As shown in block diagram in FIG. 17, Clock Synthesizer circuit 1205 comprises a 25.856 MHz voltage controlled crystal oscillator (VCXO) 1201, a divide-by-1616 circuit 1702, two phase/frequency detectors, 1703 and 1704, two loop amplifiers 1705 and 1705a, a voltage controlled oscillator (VCO) 1706, a frequency selection circuit 1707, and two additional divide circuits, 1708 and 1709.

Frequency selection circuit 1707 is configured via shorting block jumpers to derive any one of several predetermined frequency rates; these may include 1.024 Mb/s, 1.544 Mb/s, 6.312 Mb/s, and 12.928 Mb/s. The frequency rate selected is the system link operating frequency which, in turn, determines the output link speed. The desired link frequency is selected by grounding the proper selection line via a shorting block jumper. This jumper programs the divide function (Clock Divider/Enable circuit) needed to produce the desired frequency.

Each of the selected frequencies may be either 'locked' to an external source or free running with an accuracy of better than ±30 ppm (parts per million). Normally, the clock circuitry 1710 is synchronized solely to the internal 25.856 MHz VCXO 1201 which is the primary reference oscillator; this is designated the internal mode of operation. While in this mode, a field effect transistor (FET) 1711 at the output of the external clock circuit 1710 effectively removes external clock circuit 1710 from the overall clock synthesizer circuit. When output PWA 350 is jumpered for internal operation (free running), a zero-volt level is applied to FET 1711 causing it to conduct and thereby ground the external clock circuit 1710 output.

When the output PWA 350 is jumpered to allow an external source (EXT CLK input used), the conduction of FET 1711 is inhibited via a 5 V level being applied; while in this mode, the deviation voltage produced by external clock circuit 1710 is applied to the input of the VCXO 1201 and also to the Summing amplifier 1740 at the input to the VCO 1706 thereby produces a change in the output frequency to phase lock the internal oscillator to the external source. The result is a tracking range of approximately ±100 ppm. The external clock input select circuit 1712 may be jumpered for use with either a TTL input or a differential input 1713.

When in the free-running mode, the VCXO 1201 output of 25.856 MHz is applied to both the divide-by-1616 circuit 1702 which produces a 16 KHz output signal 1714 and to the clock enable/divider circuit 1709 to enable the 12.928 MHz clock (DS-A) signal to be derived. The 16 KHz output 1714 from divide-by-1616 circuit 1702 is applied to the dual phase detector 1703 and compared to the 16 KHz output from the VCO divider circuit 1708. Phase detector 1703 accepts the TTL waveforms and generates an error voltage that is proportional to the frequency and/or phase difference of the input signals. These signals should remain near constant in both frequency and phase. Depending upon the link frequency selected, the error voltage produced should maintain the VCO 1706 output frequency in the range between 12.35 MHz and 12.65 MHz. The frequency produced (VCO OUT) 1715 is used as a second input to the clock divider/enable circuit 1709 to derive the remaining link clocks 1716 (1.024 MHz, 1.544 MHz, 3.152 MHz, and 6.132 MHz.

Link Output Circuits

As shown in the detailed block diagram of FIG. 17, Link Output circuit 1701 comprises a selectable randomizer 1204, line drivers 1719 for both TTL balanced differential data and clock outputs, line drivers 1718 for fiber optic data and clock outputs, line drivers 1720 for the bit clocks sent to the individual FIFO channels, and a configurable AMI output circuit consisting of an NRZL-to-AMI converter 1721, a T1/T2 encoder 1722, a violation encoder (not shown), an output driver 1723 and a line matching circuit 1724.

Data streams received from the microprocessor PWA output data multiplexer 340 are applied first to the input of a standard IRIG 15-bit randomizer 1204 which can be activated or bypassed by the insertion of a single shorting block jumper. When randomizer 1204 is activated at this point, note that all three data outputs will be randomized. It is recommended that randomizer 1204 be used when low density or fixed patterns are to be transmitted to the demultiplexer 110. The demultiplexer 110 has a de-randomizer 502 on its bit-sync PWA 410 that must be jumpered into the input circuit for compatibility.

The output data, randomized or unrandomized, are clocked into data flip-flop 1725. Both ONE and ZERO outputs of data flip-flop 1725 are applied to separate line drivers within data and clock line drivers 1718 to provide isolated outputs for both the key generator (KG) and fiber optic (FO) data outputs 1729, 1729a; the same function is performed for the associated clock outputs 1730 and 1731 by clocks signal CLOCK2 on line 1732 and its inversion/CLOCK on line 1733.

III. DETAILED FUNCTIONING OF THE DEMULTIPLEXER

This section provides detailed information regarding the operation of the demultiplexer of the present invention. Detailed block diagrams are provided for each of the assemblies shown on the simplified block diagrams discussed above.

1. BIT SYNC PWA 410

FIG. 19 shows the Bit Sync PWA 410, which provides the circuitry needed to interface the present invention with the output link.

Input Interface Circuit

Input interface circuit 1901 provides several receiver circuits to accept data and clock signals received from communications equipment such as a microwave link, a fiber optics receiver, or a decryption unit. The receiver type to be used is configured into the data path by inserting shorting pin blocks (jumpers) over selected pins provided on the Bit Sync PWA 410 (not shown). Three types of inputs 413 may be applied:

1) NRZ (high or low) Differential data and clock inputs, balanced or unbalanced, 75 or 120-ohm impedance,
2) NRZ (high or low) TTL data and clock inputs, 120-ohm impedance, and
3) a bipolar AMI data input, 75 or 120-ohm impedance.

The routing of each type input 413 into the data path is as follows. The NRZ differential data 413a and 413b and clock 413c and 413d inputs are jumpered to separate differential receiver/amplifiers discussed in detail below. The amplified signals are then routed to their associated jumper selection circuits 1902, 1903 as the DIF inputs to an exclusive OR-gate. The second input of both exclusive OR-gates is jumpered to enable either an inverted (INV) or non-inverted (NOR) output to one of two associated select multiplexer 514, 515, as follows.

The TTL NRZ data and clock inputs 413e and 413f are applied directly to their jumper circuit 1902 or 1903 for selection as the TTL input to the exclusive OR-gate. Both inputs 413e and 413f may also be inverted or left unchanged prior to being applied to their respective select multiplexer, 515 or 514.

The AMI input is selected by jumpering the data input lines 413a and 413b to the 75/120-ohm impedance matching circuit which is transformer coupled to the input line 413. Impedance matching is achieved via a single jumper. Input signal 413g is then applied to two AGC/Equalizer stages 1905 and 1906 and output to an AMI data slicer 520 which is designed to receive and process both T1, T1C, and T2 data. Violation decoder 518 is included to provide eight-zero deletion decoding for T1 and T1C data as well as six-zero deletion decoding required for T2. The decoding to be performed is jumper selectable. When AMI data 413g is to be processed, an internally generated clock 1907 is used.

Data 515 and clock select multiplexers 514 allow selection between the chosen (DIF or TTL) NRZ data and clock inputs 413 and the AMI data input 413g and the internally generated clock 1907, in accordance with the data to be demultiplexed and the desired output signal format. The desired output from each select multiplexer 515 and 514 is enabled via shorting pin blocks (not shown) in the preferred embodiment of the present invention.

The outputs 515 and 514 enabled from the two Select Multiplexers are routed to a standard IRIG 15-bit de-randomizer 522, the output of which can be selected or bypassed by the insertion of a single shorting pin block jumper. The data output enabled to the data output Multiplexer 1912 is, in turn, output to Microprocessor PWA 420 for further processing.

Clock Synthesizer/Bit Synchronizer Circuit

The Clock Synthesizer/Bit Synchronizer circuit 512 comprises a dual phase detector 1920, a loop filter/amplifier 1921, a summing amplifier 1922, a 25.856 MHz voltage controlled crystal oscillator (VCXO) 517, a voltage controlled oscillator 1923, and a programmable clock selection/bit synchronizer circuit 516.

Bit synchronizer circuit 516 operates on either NRZ-L data, input on line 1924, or AMI data on line 1931. The operating frequency of Bit Synchronizer 516 is determined by outputs STO-ST3 1926 of clock selection circuit 1925. The selected operating frequency determines the frequency enabled in bit synchronizer 516 and also sets up the proper divide functions to be performed by VCO divider 1927.

The operation of clock synthesizer circuit 512 is centered around 25.856 MHz VCXO 517. Dual phase detector 1920 senses the difference between the reference voltage output 1928 of divide-by-1616 circuit 1929 and the output of VCO divider circuit 1927. The error voltage produced by VCO 1927 is applied to loop filter 1921, through summing amplifier 1922, to the frequency control input (not shown) of VCO 1923.

Clock synthesizer 512 operates by scaling the output VCXO 1930 of 517 down to 16 KHZ by dividing it by 1616. This 16 KHZ frequency 1928 is the largest common factor of the required link frequencies. The 16 KHZ frequency 1928 is multiplied by a selectable value in the inner loop to match the actual channel rate. A portion of the loop filter's output is also fed back into the loop to stabilize the overall loop dynamics. After multiplying by the selectable value, the output is then divided by a second value which provides a reference frequency supplied to phase detector 1920. The final frequency output is determined by the two multiplication values selected.

Bit synchronizer 516 synchronizes internal clock 1907 to applied data 1924 and 1931. To perform this function bit synchronizer 516 compares data transitions to clock transitions and generates error signals for AMI data and for NRZ data that are filtered to provide a control voltage 1937 by VCXO Control circuit 1936. Control voltage 1937 is applied to both VCXO 517 input and, via summing amplifier 1922, to VCO 1923 input for advancing or retarding the selected frequency.

When bit synchronizer 516 is jumpered to operate at the highest frequency of 12.928 MHZ 1938 (DS-A), the output of VCXO 517 of 25.856 MHz is directly utilized as the reference frequency. If any other frequency is selected, the reference frequency used is the output of VCO 1923. Depending upon the selected frequency, the frequency produced by VCO 1923 will be in the range of 12.35 and 12.65 MHz. The subsequent divide function enabled in Bit Synchronizer 516 will yield the proper operating frequency.

2. MICROPROCESSOR PWA 420 BLOCK DIAGRAM DESCRIPTION

Microprocessor PWA 420 (FIG. 20) provides the circuits required to generate the enable, load, clock, and interrupt signals needed to strip the overhead bits 260 from the data packet, decipher them to achieve packet synchronization and to derive the channel ID, and to enable the proper FIFO channel to receive the data for further processing. Microprocessor PWA 420 also contains the circuit needed to identify any fill data packets received. The format of the incoming data packet is as illustrated in FIG. 2.

The circuits of Microprocessor PWA 420 are divided into three basic sections: the Timing Generator Section 2001, the Microprocessor Section 612, and the Input Decoding and Circular Buffer Section.

Timing Generator

Timing Generator 2001 performs the related data timing generation and synchronizes the operation of microprocessor 612 to link data clock from bit sync PWA 410. Timing Generator 612 is primarily a counter/PROM design. The output of a counter addresses two PROMs (all within Timing Generator 2001) whose outputs provide all the necessary timing relative to bit position in frame 200. The PROM outputs are latched by the data clock to eliminate transitions during the access time of the PROMs from affecting clock or reset lines. Latches (not shown) clocked on both leading and trailing edges of the link data clock 2003 provide set up times where required. The counter within Timing Generator 2001 is reset by a PROM output that is also used as the frame 200 reset pulse 2004. This signal 2004 is used to synchronize the operation of the microprocessor to the input data stream (not shown).

Figure 21:
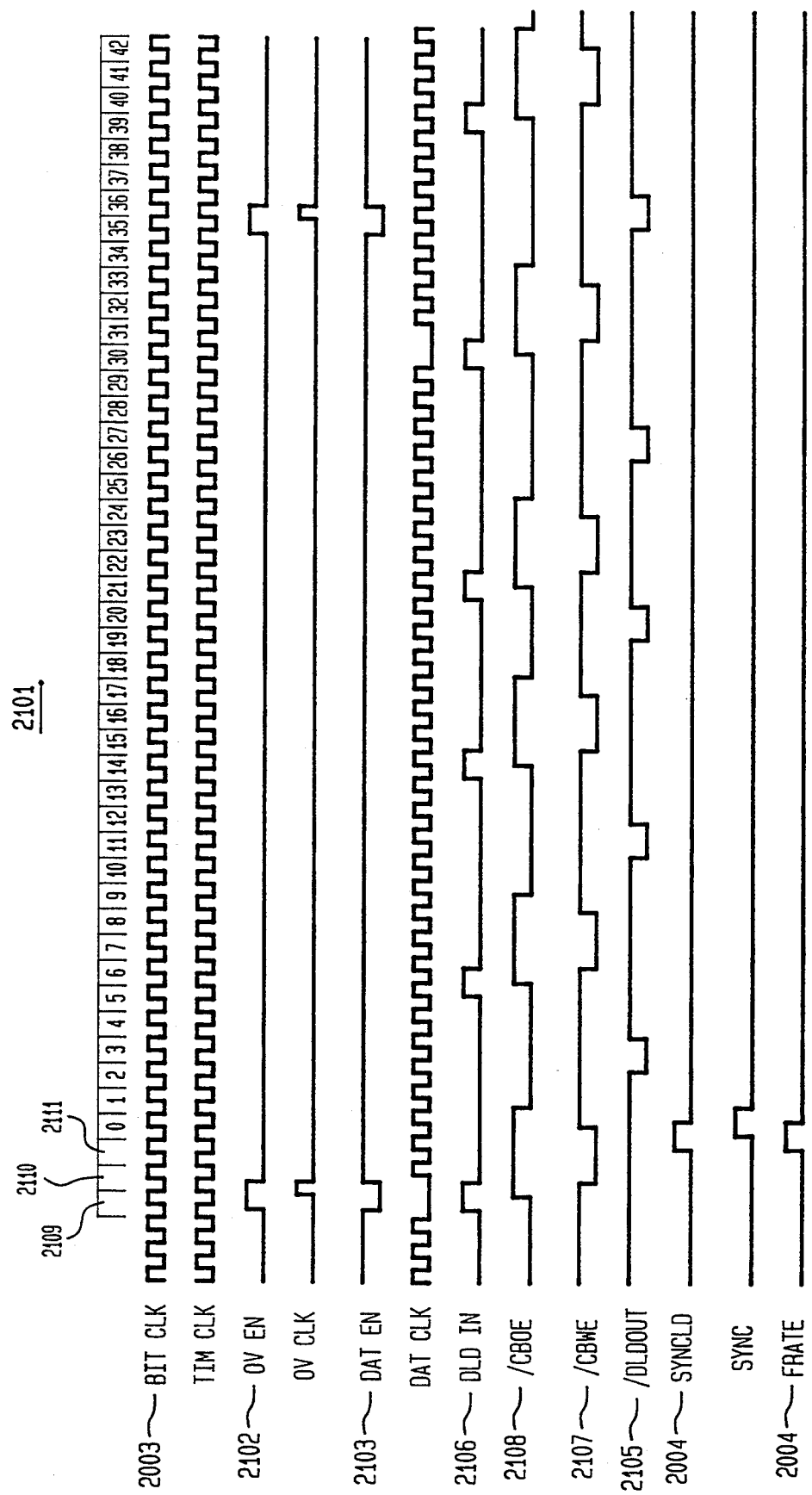
FIG. 21 illustrates a timing diagram of the operation of the microprocessor of the demultiplexer of the present invention.
Figure 23:
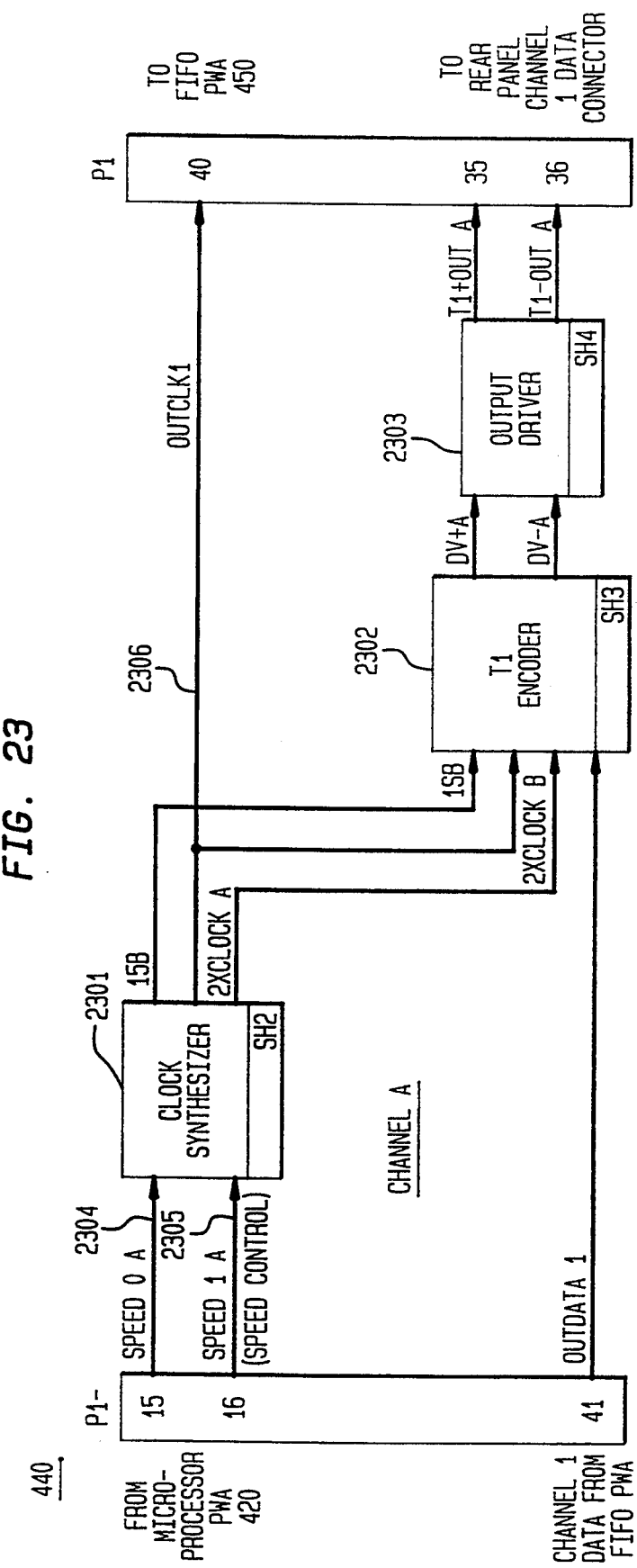
FIG. 23 is a detailed block diagram of the output interface circuit of the demultiplexer of the invention.
Figure 24:
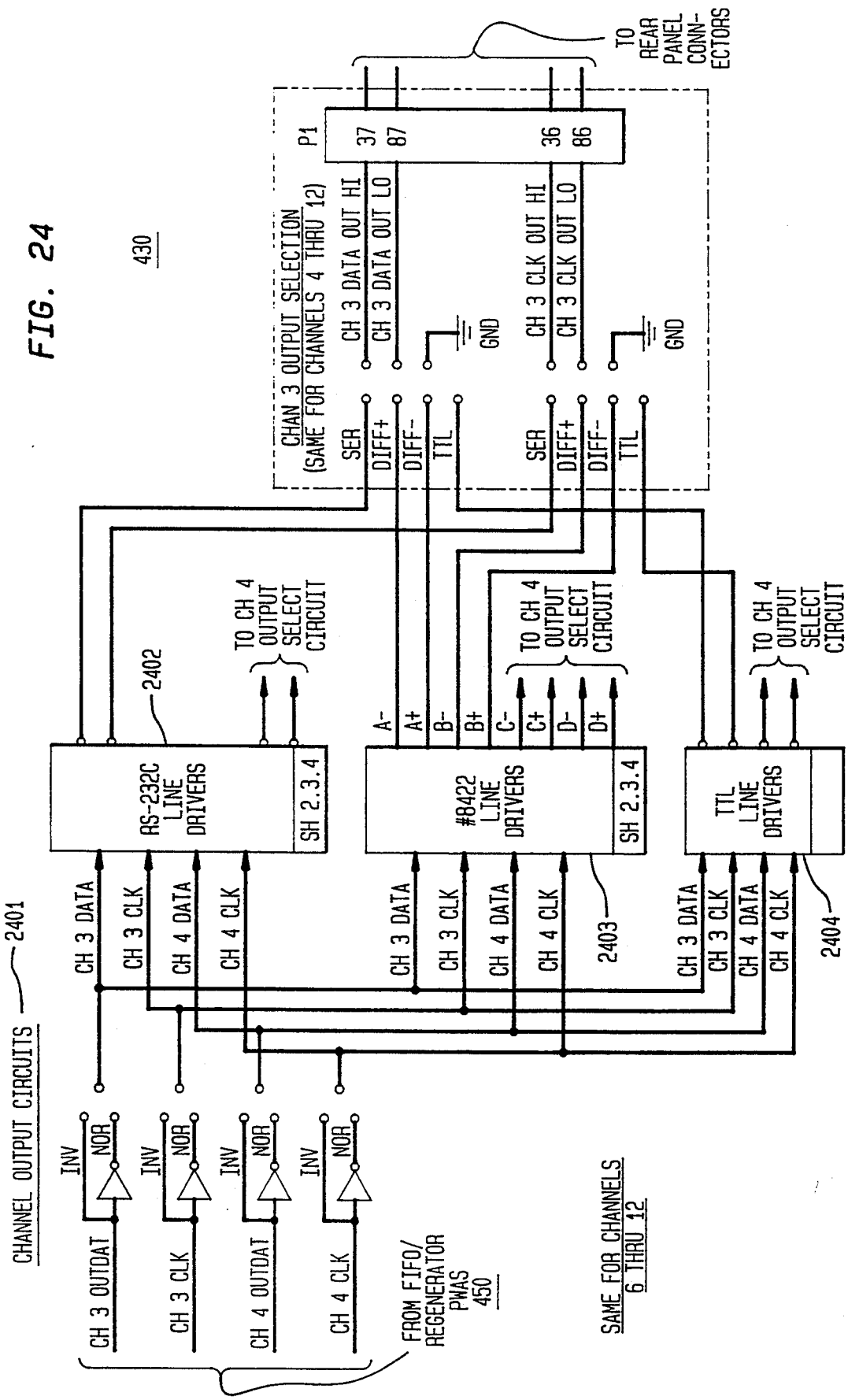
FIG. 24 is a detailed block diagram of the data transmitter circuit of the demultiplexer of the present invention.

The signals enabled by Timing Generator 2001 are listed and described below. FIG. 21 provides a timing diagram 2101 for the signals enabled by Timing Generator 2001.

| SIGNAL | FUNCTION |
| --- | --- |
| CBOE 2108 (Circular Buffer Output Enable) | Used to enable data out of the Circular Buffer 604 (64 link data clocks) |
| Bit Clk 2003 (Link Data Clock) | Clock rate of the data link |
| OV EN 2102 (Overhead Enable) | Enables the overhead bits 260 into 44 Bit Overhead Shift Register 606 |
| DAT EN 2103 (Data Enable) | Enables the data clock to the selected FIFO channel to clock the data outputted by Circular Buffer 604 into FIFO PWA 450 |
| SYNC LD 2104 (Sync Load) | Loads the sync correlation data into Sync and Channel ID Decoder output register 608 |
| DLDIN 2106 (Data Load In) | Loads the data, a byte at a time, into the Circular Buffer 604 RAM |
| /DLDOUT 2105 (Data Load Out) | Shifts the data, a byte at a time, out of the Circular Buffer 604 into the FIFO Data Buffer 752 |
| /CBWE 2107 (Circular Buffer Write Enable) | Used to write data, a byte at a time, into the Circular Buffer 604 RAM |

Microprocessor

The microprocessor 619 section 420 (right side of FIG. 20) includes the microprocessor 612, its program PROMS and I/O ports. Microprocessor 612 may be a Texas Instrument TMS32010 chip which features a 16-bit data bus structure, a 12-bit address bus, a 5 MHz instruction rate for most instructions, an internal 16-bit multiplier, and sufficient internal memory to eliminate the need for additional memory. A Reset Control 2005 circuit is provided to monitor the operating voltage. Should the operating voltage fall below the minimum acceptable limit, initialize signals are generated to reset microprocessor 612, the Sync and Channel Decoder PROMs 608, and each of the twelve FIFO channels located on FIFO/CLK Regenerator PWA 450. The operating program for microprocessor 612 is stored in two external 4K×8-bit PROMS 619 interfaced to microprocessor 612 via a 16-bit bi-directional bus 2007.

Three of the twelve address lines of microprocessor 612 are applied to two 3-line to 8-line decoders 610 for the purpose of generating enable and load signals to allow selection of up to 16 input/output ports (only 12 of which are used). Microprocessor 612 controls the frame synchronizer circuitry to ensure that the serial input stream is synchronized properly. Frame synchronization is essential to perform all the other functions needed to process the data. Microprocessor 612 starts the synchronization by setting a search flag 2010 via an output port. Flag 2010 enables synchronization of the Timing Generator 2001 upon detection of the sync pattern. Once synchronization has been achieved, microprocessor 612 resets search flag 2010 and monitors the input port containing the correlation of the sync pattern to maintain synchronization.

Once microprocessor 612 has processed this data, it uses the setup clock output port 2013 to send the FIFO/CLK Generator PWA 450 set up information. Setup clock output port 2013 feeds a shift register (not shown) which selectively clocks the setup data from the setup data buffer (2020) into that specific channel's setup shift register.

Microprocessor 612 uses channel reset port 2014 to selectively reset any particular channel's FIFO fullness counter and pointers. The output clock inhibit port 2015 allows microprocessor 612 to inhibit any particular channel's output clock while data are accumulating in its FIFO (not shown). No channel's output clock will be enabled until that channel's FIFO is at least one-half full.

Input Decoding and Circular Buffer

The input buffer and circular buffer section 2002 perform the channel synchronization, the channel decoding, and the data demultiplexing functions. Frame synchronization and channel ID decoder circuit 608 is used to separate overhead bits 260 (the first bits of each of the sixty-four 33-bit words) of frame 210 from the channel data. Overhead bits 260 of frame 210 are clocked into 44-bit overhead shift register 606 whereas the data portion of frame 210 is clocked into a fixed length circular buffer 604 to stage the data prior to being demultiplexed into the respective output FIFO channels. Circular buffer 604 is required to stage the data accumulated while the sync and the channel ID bits are being accumulated and decoded in the sync and channel decoder PROMs 608.

The 44-bit overhead shift register 606 collects the 20-bit sync pattern (not shown) into the address space of two 1K×4-bit PROMs (not shown). Each address space holds one-half of the sync pattern. The PROMs are programmed such that the data content of each address is equal to the number of bits of correlation between the sync pattern and that address. The outputs of these two PROMs form the input to a third PROM that is programmed as an adder. When the contents of 44 bit overhead shift register 606 are aligned with the address space of the PROMs, the sync correlation number is clocked into a register (not shown) that can be read by microprocessor 612.

The outputs of 44-bit overhead shift register 606 also form the address space of channel decoding PROMs 608. The channel ID is comprised of 4 bits, repeated 11 times. Each of the four channel bits is decoded by a 2K×4 PROM (not shown) whose address space is comprised of the 11 repetitions of that bit. Only one of the four PROM data bits is used, and it is programmed to be a majority vote of the number of ones in its address space. When the 44 channel ID bits are aligned with the address space of the decoding PROMs, the PROM outputs are latched by Timing Generator 2001 into the same input port used for the sync correlation data.

Data leaving the circular buffer 604 are then routed, via the FIFO Data Buffer 2016, to the FIFO circuits on all of the FIFO/Regenerator PWAs 450 but are only clocked into the FIFO circuit for the channel specified by the decoded channel ID.

Circular buffer 604 is implemented using a RAM and an address generator. Shift registers 2017 provide serial-to-parallel and parallel-to-serial conversion. The RAM is a 2K×8-bit CMOS static RAM. A circular buffer address generator 2018 comprises a single address counter, an adder, and an address demultiplexer; it is incremented by Timing Generator signal 2001. The adder is used to maintain a fixed offset between the input and output addresses. The difference determines the length of the buffer and the amount of delay it provides.

Circular buffer address generator 2017 selects between the counter output and the adder output for the RAM address space. Circular buffer address generator 2017 of the present invention is controlled by a signal from timing generator 2001. Since the data are received serially from circular buffer 604 and the RAM data inputs are parallel, an input shift register 2021 is used to make the serial-to-parallel conversion. The data output (not shown) is then parallel-to-serial converted and applied to inputs of six line drivers within FIFO data buffer 2016 for distribution to the FIFO channels on each of the six FIFO/CLK regenerator PWAs 450.

3. FIFO/CLK REGENERATOR 450 (FIG. 22)

Figure 22:
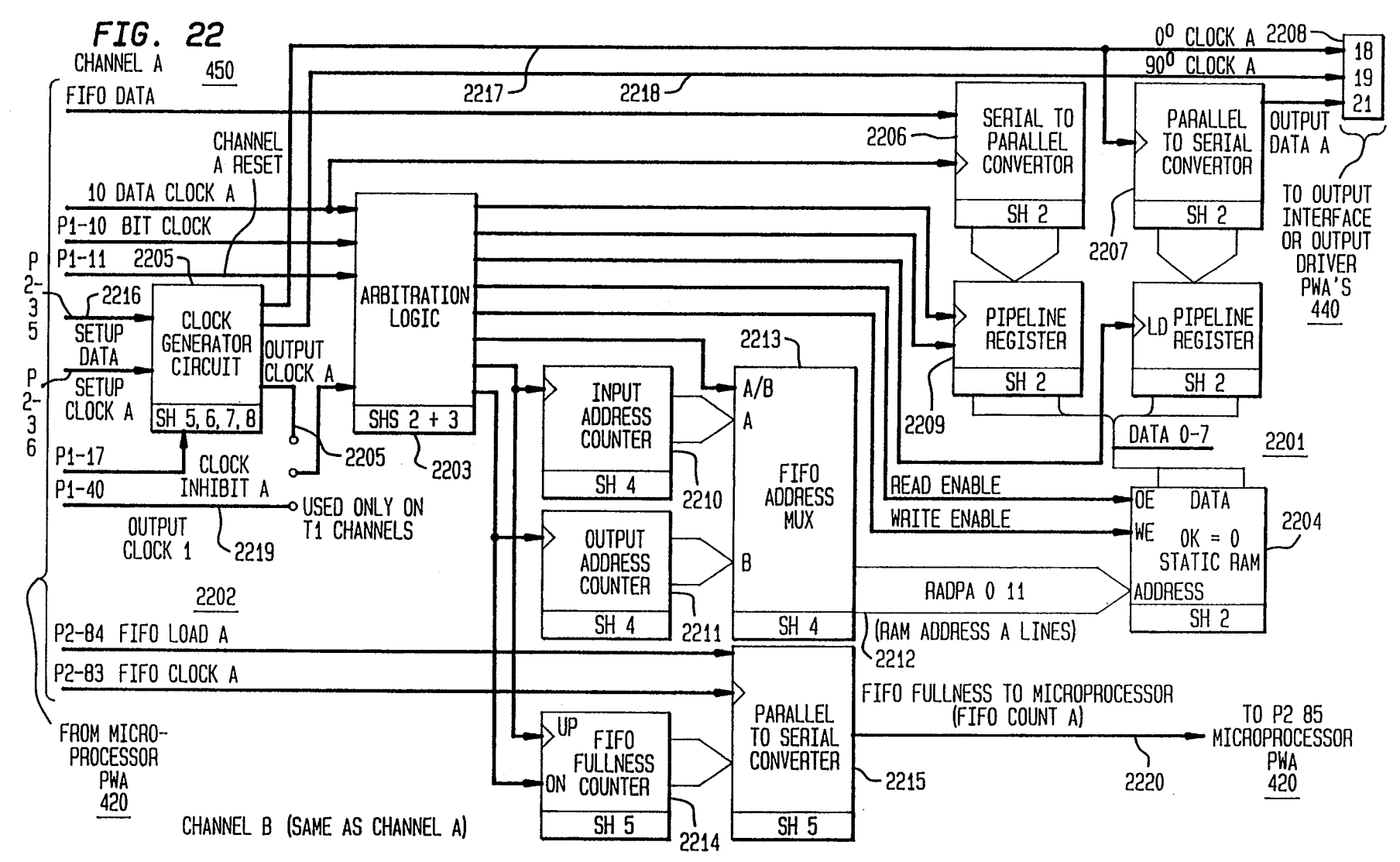

FIG. 22 shows the FIFO/CLK regenerator 450, which includes two identical circuits, designated Channels A and B, for processing the data and clock signals received from Microprocessor PWA 420. Since the operation of each channel is identical, only Channel A will be described in the following text.

Each channel comprises two major circuit portions that provide control over the output data and provide a continuous uninterrupted data clock. The first portion, designated the data control circuit 2201, provides control and storage by utilizing a FIFO circuit design to accumulate the input data which is received in packet bursts of 2048 bits. Since the arrival frequency of these data bursts can vary substantially due to the asynchronous nature of the input data, the FIFO capacity must be large enough to store several packets of data. The preferred embodiment of the present invention uses a 4K×8 capacity FIFO, in which 16 total packets can be stored. The data control circuit provides a fullness output to microprocessor 612 (located on Microprocessor PWA 420) that indicates the amount of data stored in the FIFO (FIFO fullness count). Microprocessor 612, in turn, utilizes this information in determining output clock speed control.

The second major circuit portion, designated the clock generator circuit 2202, comprises a programmable frequency synthesizer that provides the "regenerated" channel clock. Both the data control circuit 2201 and the clock generator circuit 2202 are discussed in detail as follows.

Data Control Circuit

The timing signals needed for writing data into and reading data out of FIFO clk regenerator PWA 450 are generated by arbitration logic 2203. The channel input clock, which is derived from the link bit rate of microprocessor PWA 420, is applied to arbitration logic 2203 for use in clocking the channel data into FIFO 2204. This clock is active only when this particular FIFO channel is to receive data. Setup data, received from microprocessor PWA 420, is applied to clock generator circuit 2205 to determine the rate of the channel output clock 2205 used to clock the data out of FIFO 2204 to the associated channel output circuit.

The transfer of data to a FIFO channel arrives in bursts of one packet length (2048 bits). To both delay and exercise control over the serial input data stream, the data is first serial-to-parallel converted at 2206 for storage in FIFO 2204 and then, on a priority basis, parallel-to-serial converted for transfer to associated output circuit 2208. To accomplish this, the data is first routed to an 8-bit serial-to-parallel converter 2206 where it is clocked in at the input channel clock rate (DATA CHANNEL A). The data channel clock is also applied to an eight-bit counter circuit (not shown) to generate the clock signal which is used as the write request to load the output (8 bits) from serial-to-parallel converter 2206 into the 8-bit pipeline register 2209. As every eighth bit is detected, the data is loaded into pipeline register 2209 and then rippled into FIFO 2204 which is implemented by a 8K×8-bit static RAM (not shown). Each data packet is stored as 256 bytes (2048 bits).

Generation of the address signals for accessing FIFO 2204 is accomplished using two counter circuits 2210 and 2211, one for input addressing and one for output addressing. Input address counter 2210 is incremented as each byte of data is written into FIFO 2204 while output address counter 2211 is incremented as each byte is read out of FIFO 2204. The twelve outputs from counters 2210 and 2211 allow addressing 2048-byte locations of FIFO 2204. The outputs of counter 2210 and 2211 are applied to separate registers made up by tri-state flip-flops in FIFO address mux 2213. The outputs of each register provide address signals to FIFO 2204. Write and read enable signals generated by arbitration logic 2203 determine which counter 2210 or 2211 output is enabled to FIFO 2204. When the outputs of one counter either 2210 or 2211 are enabled, the other counter will be inhibited and a high impedance provided.

FIFO fullness counter 2214 contains the FIFO fullness count in bytes. This count is loaded into parallel-to-serial shift register 2215 to make FIFO fullness counter 2214 data available to microprocessor 612 in serial form.

Clock Generator Circuit

The clock generator circuit 2202 recreates the original data clock frequency that clocked the data into the channel's input at the multiplexer of the present invention. The frequency synthesizer used (not shown) is part of a closed loop that utilizes the FIFO fullness count. Microprocessor 612 is used to close the loop by utilizing the feedback received in the form of the FIFO fullness count to determine the appropriate setup data that is required to setup Clock Generator Circuit 2202 and thereby synthesize the original channel frequency.

Microprocessor 612 determines the input frequency of any particular channel by measuring the average interval, in frames, between receiving packets of that channel's data. Microprocessor 612 uses the channel identification and input frequency to update the output bit rate from the corresponding channel. When data is received from a particular channel, the contents of that channel's FIFO fullness register 622 is used to update the data output rate from that FIFO.

More particularly, packets arrive at the demultiplexer from time to time. The FIFOs are used to buffer data from the packets such that data for each channel is output by the demultiplexer in an essentially steady stream. The arrival rate of the packets are used, according to this important aspect of the invention, to control the output bit rate from the demultiplexer.

Figure 25:
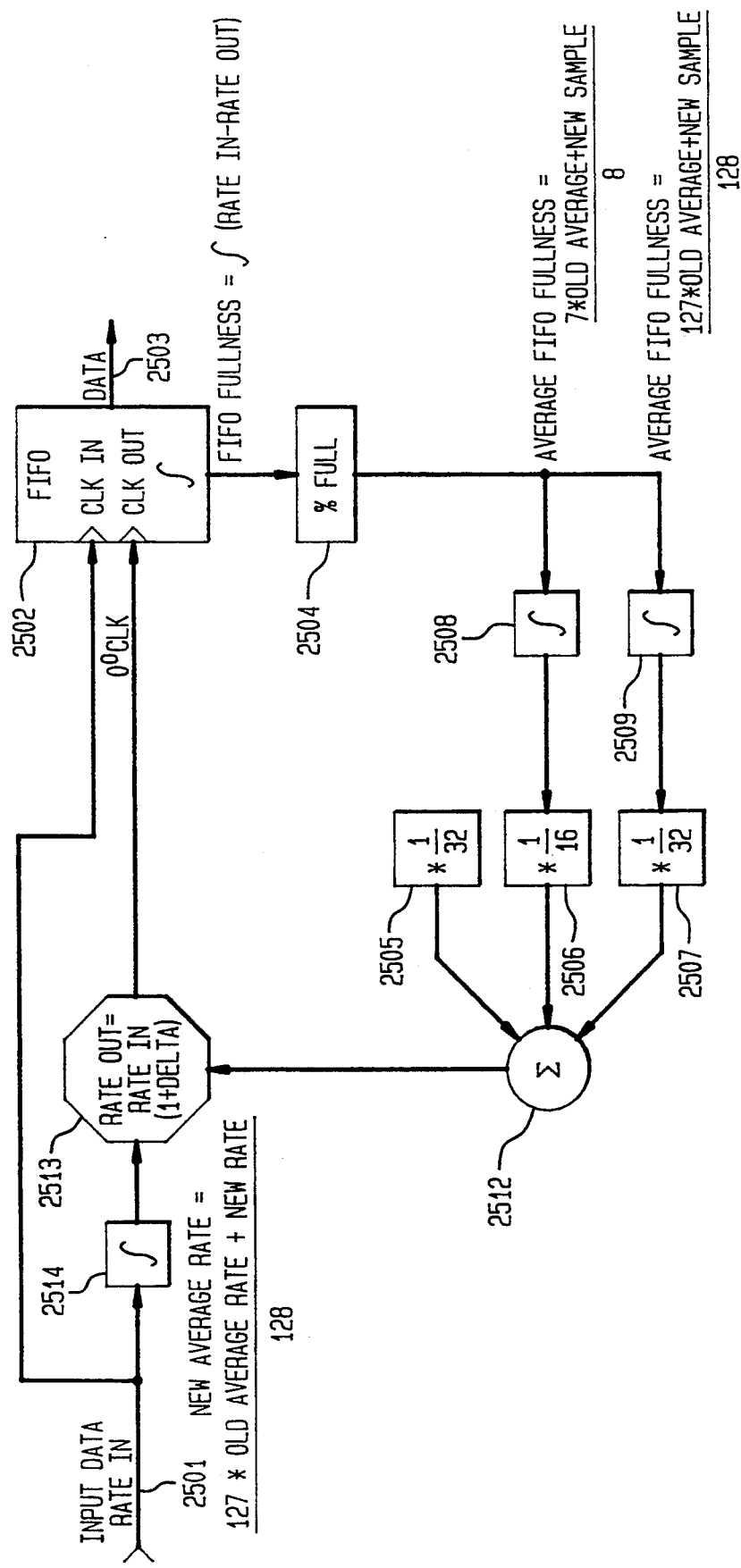
FIG. 25 is a depiction of the manner in which the demultiplexer data rate is derived.

FIG. 25 shows how this is accomplished. Data arrives on line 2501. It is stored in FIFO 2502 corresponding to one of FIFOs 2016 of the demultiplexer. Data is supplied to the output of the demultiplexer over data line 2503. A number is calculated, termed "FIFO fullness," which is effectively the integral of the rate of data input to the FIFO less the rate of data removed from the FIFO. "FIFO fullness" thus is a measure of the degree to which the FIFO is full. The block 2504 marked "% full" contains this variable. This variable is applied to scaling blocks 2505, 2506, 2507 in which it is multiplied by the numerical factors shown in order to control the amount of feedback this quantity provides to the data output rate. The latter two scaling factors 2506, 2507 are applied after recursive average filtering in blocks 2508, 2509 which in effect provide weighting of the adjustment to the output sample rate provided by this circuit. The equations used in blocks 2508, 2509 are indicated on FIG. 25.

The sum of the outputs of the three scaling blocks 2505-2507 are summed in a summing node 2512; the sum, termed "delta" is supplied to block 2513 in which it is summed with the previous output rate (rate in) at 2514 to generate the new output rate, "0° clk".

4. OUTPUT INTERFACE PWA 440 (FIG. 23)

The Output Interface PWA 440 (FIG. 23) provides the circuits required to interface the AMI data streams of Channels 1 and 2 with output circuitry. Two identical circuits are provided, designated Channel A and Channel B. Each channel comprises a clock synthesizer circuit 2301, a T1 encoder circuit 2302, and an output driver/impedance matching circuit 2303.

Clock Synthesizer Circuit

Clock synthesizer circuit 2301 contains a 3.088 MHz voltage controlled crystal oscillator (VCXO) whose output can be controlled slightly up or down by an advance/retard input received from microprocessor 612 over lines 2304 and 2305. Inputs 2304 and 2305 are applied to an analog amplifier within clock synthesizer 2301 for conversion to an error voltage for application to the VCXO control input. The reference frequency output is applied to the clock input of a flip-flop (not shown) which, in turn, performs a divide-by-two function. The resultant clock on line 2306, is supplied to microprocessor 612 to clock data into T1 Encoder circuit 2302 from the associated FIFO channel.

The T1 Encoder circuit 2302 is used to convert signals to a standard AMI/B8ZS encoded data stream.

5. DATA TRANSMITTER PWA 430

Data Transmitter PWA 430 (FIG. 24) provides three types of output circuits to interface the TTL data and clock signals received from FIFO Channels 3 through 12 with an assortment of user PCM systems. Output driver circuits 2401 are based on three types of IC chips: Texas Instruments type SN75188, Advanced Micro Devices type Am26LS31, and Texas Instruments type SN74LS240.

The input to each driver circuit 2401 includes jumper pins (not shown) to configure each channel's data and clock signal to be applied either directly to the input of each type IC chip to enable an inverted polarity (INV) output or indirectly through an inverter to enable the reverse polarity (NOR) output. This feature is incorporated to allow NRZ-H or NRZ-L compatibility. Configuration is accomplished by inserting shorting pin sockets into designated terminals (not shown).

The type SN75188 chip provides four RS-232-C line drivers 2402 designed to interface TTL data terminal equipment with data communications equipment in conformance with the specifications of EIA Standard RS-232-C.

The type Am26LS31 chip provides four RS-422 line drivers 2403 designed for digital data transmission over balanced lines and meets all the requirements of EIA standard RS-422 and federal standard 1020. It is designed to provide unipolar differential drive to twisted-pair or parallel-wire transmission lines.

The type SN74LS240 chip provides eight TTL line drivers 2404 designed for digital data transmission over twisted-pair or parallel wire transmission lines.

The channel outputs enabled by each driver type are routed to individual terminals on their respective channel's output configuration circuit. Configuration is accomplished by inserting shorting pin sockets into selected terminals.

SUMMARY

It will have been appreciated that according to the invention, data arriving from a plurality of asynchronous channels at the multiplexer according to the invention is stored in FIFO's until packets of predetermined size each storing the data from one channel are accumulated. The packet is then transmitted. When received by the demultiplexer, the packets are stored and are dispersed or demultiplexed onto the output lines at the rate at which they were stored by the multiplexer.

The demultiplexing of the received signal is automatically constrained to take the same rate as the receipt of the input signal by monitoring the rate at which FIFO buffers storing the packets of the input signals fill. Because the packets are sent by the multiplexer at the same rate the input data fills the multiplexer FIFO's, they are received by the demultiplexer at the same average rate at which data was originally received by the multiplexer.

By sending data from the multiplexer to the demultiplexer in packets, substantial improvements in processing efficiency and reduction of overhead are implemented. This occurs simply because relatively less address and channel identification information need be provided with each packet of data transmitted, as compared to a system in which each individual word or group of words were sent separately as was usual in the prior art.

Another advantage is provided by the fact that all channels are treated identically. In this way the multiplexer requires no internal reconfiguration to reconfigure the multiplex (combination of channels) to be transmitted. If data is received in a particular channel during a period of time it will be accumulated into a packet and sent. If not, no time slot will be uselessly occupied by the particular packet. No communication between demultiplexer and multiplexer is required, and operator intervention is greatly reduced.

While a preferred embodiment of the invention has been described in detail above, this should not be considered a limitation of the invention, but merely exemplary thereof. The invention is to be limited only by the following claim.

What is claimed is:

1. A system for communicating data received from a plurality of channels at asynchronous and varying data rates, comprising:

multiplexing means, comprising:

means for accepting data from a plurality of asynchronous channels;

a plurality of buffers for storing the data received from each of the channels;

means for monitoring the fullness of each of said buffers; and packetizing means for sending packets of data of predetermined length from each of said buffers, when said buffers become essentially full, wherein each of said packets of data comprises a plurality of data words each preceded by an overhead bit;

transmission means for transmitting said packets from said multiplexing means at the transmitting location to a receiving location; and demultiplexing means at the receiving location, comprising;

means for receiving said packets of data transmitted from said multiplexing means;

buffer means for storing said packets of data;

means for monitoring the rate at which packets of data corresponding to individual channels are received; and means for removing data from said buffer means at rates responsive to said monitored rates and for supplying the removed data to output means for processing said data, whereby said data is supplied to said output means substantially at the rate at which the data arrives at the multiplexing means from the asynchronous channels.

2. The system of claim 1, wherein the data carried by said plurality of channels comprises telemetry information.

3. The system of claim 1, wherein the data carried by at least one of said plurality of channels is NRZ data.

4. The system of claim 1, wherein said buffer means and said plurality of buffers comprises FIFOs.

5. The system of claim 1, wherein said means for removing data from the buffers of the demultiplexing means comprises clock synthesizer means for supplying the data to said output means at the rate at which the data arrives at the multiplexing means.

6. The system of claim 1, wherein said packetizing means comprises means for associating the packets of data with channel identification data.

7. The system of claim 1, wherein said packetizing means comprises means for associating the packets of data with channel identification and sychronization data.

8. The system of claim 1, wherein each of said packets of data comprise 64 32-bit data words.

9. The system of claim 7 wherein each said overhead bit comprises one bit of either channel identification or sycnchronization data.

10. The system of claim 1, wherein said demultiplexing means further comprises channel identification means.

11. The system of claim 1, wherein each of said means for monitoring comprises microprocessor means.

12. Apparatus for multiplexing data received from a plurality of channels at asynchronous and varying data rates, comprising:

means for accepting data from a plurality of asynchronous channels;

a plurality of buffers for storing the data received from each of the channels;

means for monitoring the fullness of said buffers; and means for sending packets of data of a predetermined length from each of said buffers, when said buffers become essentially full, wherein each packet of data comprises at least two overhead bits and at least two data words interspersed with said overhead bits.

13. Apparatus as set forth in claim 12 wherein said buffer means comprises FIFO means and means for filling and emptying said FIFO means.

14. A multiplexing method for communicating data received from a plurality of channels at asynchronous and varying data rates, which method comprises the steps of:

accepting data from a plurality of asynchronous channels;

buffering the data received from each of the channels in buffers;

monitoring the fullness of said buffers; and transmitting packets of data of a predetermined length from each of said buffers when said buffers become essentially full, each of said packets of data comprises a plurality of data words each preceded by an overhead bit.

15. The method of claim 14, comprising the further step of assembling said data into packets of data together with channel identification information prior to said transmitting step.

16. The method of claim 15 wherein said packets of data each comprise 64 of said data words, each data word being 32 bits wide.

17. The method of claim 15 wherein each of said overhead bits is associated with one bit of said channel identification information.

18. An Apparatus for demultiplexing packets of multiplexed data, said packets of data having been multiplexed by multiplexer means after having been received from a plurality of channels at asynchronous and varying data rates, said apparatus for demultiplexing comprising:

means for receiving packets of multiplexed data;

buffer means for storing said received packets of data;

means for monitoring the rate at which packets of data corresponding to individual channels are received, wherein said means for monitoring comprises means for measuring at average interval between successive arrivals of said packets of data corresponding to said individual channels; and means for removing data from the buffers in which the data is stored at rates responsive to said monitored rates and for supplying the removed data to output means for processing said data, whereby said data is supplied to said output means substantially at the rate at which data was received by said multiplexer means.

19. The apparatus of claim 18, wherein said buffer means comprises FIFO means and means for filling and emptying said FIFO means.

20. The apparatus as set forth in claim 18, wherein said means for monitoring the rate at which packets of data corresponding to individual channels are received comprises microprocessor means.

21. A method for demultiplexing multiplexed data received from a plurality of channels at asynchronous and varying data rates, which method comprises the steps of:

(a) receiving packets of multiplexed data;

(b) storing the packets in buffer means;

(c) monitoring the rates at which packets of data corresponding to individual channels are stored in said buffer means, wherein said monitoring comprises the step of measuring an average interval between successive arrivals of said packets of data corresponding to said individual channels; and (d) removing data from said buffer means at rates responsive to said monitored rates.

22. The method of claim 21 wherein said packets of data each comprise 64 32-bit data words.

23. The demultiplexing method of claim 22 wherein each of said data words is preceded by an overhead bit.

* * * * *